(12) United States Patent
Son

(10) Patent No.: US 9,470,876 B2
(45) Date of Patent: Oct. 18, 2016

(54) LENS MODULE

(71) Applicant: SAMSUNG ELECTRO-MECHANICS CO., LTD., Suwon-Si (KR)

(72) Inventor: Ju Hwa Son, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 270 days.

(21) Appl. No.: 14/276,435

(22) Filed: May 13, 2014

(65) Prior Publication Data
US 2015/0241660 A1 Aug. 27, 2015

(30) Foreign Application Priority Data

Feb. 27, 2014 (KR) .................. 10-2014-0023268

(51) Int. Cl.
G02B 9/60 (2006.01)
G02B 13/00 (2006.01)

(52) U.S. Cl.
CPC ............. *G02B 13/0045* (2013.01); *G02B 9/60* (2013.01)

(58) Field of Classification Search
CPC ........................... G02B 13/0045; G02B 9/60
See application file for complete search history.

(56) References Cited

U.S. PATENT DOCUMENTS

| | | | |
|---|---|---|---|
| 2011/0134305 A1 | 6/2011 | Sano et al. | |
| 2011/0310494 A1 | 12/2011 | Ise et al. | |
| 2013/0050848 A1 | 2/2013 | Lee | |
| 2013/0093942 A1 | 4/2013 | Okano | |
| 2013/0265650 A1* | 10/2013 | Chen | G02B 13/008 359/714 |
| 2013/0279023 A1 | 10/2013 | Chen | |
| 2015/0002722 A1 | 1/2015 | Chang et al. | |

FOREIGN PATENT DOCUMENTS

| | | |
|---|---|---|
| CN | 102959448 A | 3/2013 |
| EP | 2672306 A1 | 12/2013 |
| JP | 2010-237407 A | 10/2010 |
| JP | 2013-54352 | 3/2013 |
| JP | 2013-140398 | 7/2013 |
| KR | 10-2010-0040357 A | 4/2010 |
| KR | 10-2011-0042382 A | 4/2011 |
| KR | 10-2013-0024633 A | 3/2013 |
| TW | 201400852 A | 1/2014 |
| TW | 201403121 A | 1/2014 |

OTHER PUBLICATIONS

Korean Office Action issued on Sep. 4, 2015 in counterpart Korean Patent Application No. 10-2014-0023268. (3 pages in English, 3 pages in Korean).

(Continued)

Primary Examiner — Joseph P Martinez
(74) Attorney, Agent, or Firm — NSIP Law

(57) ABSTRACT

A lens module may include: a first lens having positive refractive power and having a convex object-side surface and a concave image-side surface; a second lens having refractive power and having two convex surfaces; a third lens having refractive power and having a convex object-side surface; a fourth lens having refractive power; and a fifth lens having refractive power and having a convex object-side surface, wherein the first lens, the second lens, the third lens, the fourth lens and the fifth lens are disposed in a sequential order from the first lens to the fifth lens.

53 Claims, 26 Drawing Sheets

(56) References Cited

OTHER PUBLICATIONS

Korean Office Action issued on Jan. 1, 2016, in counterpart Korean Application No. 10-2014-0023268. (12 pages with English translation).

Korean Office Action issued on Jan. 1, 2016, in counterpart Korean Application No. 10-2015-0154299. (6 pages with English translation).

Office Action dated Jan. 9, 2015 for Taiwanese Patent Application No. 103116409 and its English summary provided by Applicant's foreign counsel.

* cited by examiner

|  | RADIUS OF CURVATURE | THICKNESS/ DISTANCE | REFRACTIVE INDEX | ABBE NUMBER | EFFECTIVE RADIUS |
|---|---|---|---|---|---|
| S1 | 1.644696 | 0.401014 | 1.5441 | 56 | 1.050429 |
| S2 | 1.744633 | 0.312986 |  |  | 0.99082 |
| S3 | 2.125703 | 0.598774 | 1.5441 | 56 | 0.976918 |
| S4 | −9.08773 | 0.05 |  |  | 0.921754 |
| S5 | 20.34589 | 6.00E−01 | 1.6398 | 23 | 0.893712 |
| S6 | 3.00608 | 6.60E−01 |  |  | 1.051488 |
| S7 | −8.33696 | 7.25E−01 | 1.6398 | 23 | 1.275052 |
| S8 | −7.52229 | 0.383137 |  |  | 1.763978 |
| S9 | 1.960643 | 0.52362 | 1.5343 | 55 | 2.451421 |
| S10 | 1.396665 | 0.305449 |  |  | 2.746894 |
| S11 | 1.00E+18 | 0.3 | 1.5167 | 64 | 3.110132 |
| S12 | 1.00E+18 | 0.698908 |  |  | 3.197971 |
| IMAGE PLANE | 1.00E+18 | 0.001092 |  |  | 3.532138 |

FIG. 4

| | S1 | S2 | S3 | S4 | S5 | S6 | S7 | S8 | S9 | S10 |
|---|---|---|---|---|---|---|---|---|---|---|
| K | -0.78356 | -1.07191 | 0.056938 | 79.6435 | | 0.192872 | -49.3005 | 5.420187 | -4.93218 | -3.92629 |
| A | -0.00323 | -0.01682 | -0.03039 | -0.11515 | -0.10732 | 0.005589 | -0.03599 | -0.07858 | -0.19817 | -0.11361 |
| B | -0.01229 | -0.0242 | -0.01901 | 0.069095 | 0.099107 | 0.012922 | -0.00627 | 0.084701 | 0.097179 | 0.049415 |
| C | 0.009851 | 0.01692 | -0.00052 | 0.24633 | 0.047768 | 0.003242 | -0.02615 | -0.08303 | -0.03581 | -0.01587 |
| D | -0.02442 | -0.03657 | -0.0262 | -0.8891 | -0.24512 | 0.00513 | 0.027085 | 0.050599 | 0.009083 | 0.003265 |
| E | 0.024224 | 0.046595 | 0.069213 | 1.471068 | 0.369525 | -0.0089 | -0.01681 | -0.01935 | -0.00137 | -0.00041 |
| F | -0.01402 | -0.02522 | -0.04727 | -1.2052 | -0.27025 | 0.001765 | 0.003615 | 0.004157 | 0.00011 | 2.92E-05 |
| G | 0.003327 | 0.006393 | 0.016597 | 0.407142 | 0.07352 | | | -0.00038 | -3.64E-06 | -8.75E-07 |

FIG. 5

| | RADIUS OF CURVATURE | THICKNESS/ DISTANCE | REFRACTIVE INDEX | ABBE NUMBER | EFFECTIVE RADIUS |
|---|---|---|---|---|---|
| S1 | 1.452358 | 0.389483 | 1.5441 | 56 | 1 |
| S2 | 1.515867 | 0.291422 | | | 0.951613 |
| S3 | 1.749164 | 0.610695 | 1.5441 | 56 | 0.925452 |
| S4 | -8.0504 | 0.05 | | | 0.863679 |
| S5 | 13.69301 | 3.50E-01 | 1.6398 | 23 | 0.83644 |
| S6 | 2.468022 | 5.45E-01 | | | 0.940903 |
| S7 | -5.96828 | 5.84E-01 | 1.6398 | 23 | 1.069901 |
| S8 | -6.04265 | 0.259265 | | | 1.436729 |
| S9 | 1.44124 | 0.488784 | 1.5343 | 55 | 2.149626 |
| S10 | 1.132115 | 0.291462 | | | 2.438316 |
| S11 | 1.00E+18 | 0.21 | 1.5167 | 64 | 2.687326 |
| S12 | 1.00E+18 | 0.641987 | | | 2.744867 |
| IMAGE PLANE | 1.00E+18 | 0.008013 | | | 3.035544 |

FIG. 9

|   | S1 | S2 | S3 | S4 | S5 | S6 | S7 | S8 | S9 | S10 |
|---|---|---|---|---|---|---|---|---|---|---|
| K | -0.79945 | -1.36496 | 0.001418 | 73.16905 | 1 | -0.79956 | -49.3003 | 5.420755 | -7.16653 | -4.03449 |
| A | -0.00902 | -0.01958 | -0.03639 | -0.1461 | -0.18302 | -0.01903 | -0.0874 | -0.22119 | -0.28874 | -0.17054 |
| B | -0.01407 | -0.05935 | 0.023578 | 0.089781 | 0.178041 | 0.065501 | 0.043523 | 0.397957 | 0.192134 | 0.100623 |
| C | -0.03817 | -0.00441 | -0.31259 | 0.600486 | 0.15855 | -0.04707 | -0.24113 | -0.55136 | -0.09424 | -0.04317 |
| D | 0.077827 | 0.052207 | 0.808171 | -2.41982 | -0.80092 | 0.103218 | 0.345395 | 0.477674 | 0.032644 | 0.011952 |
| E | -0.01144 | -0.16604 | -1.23409 | 4.486971 | 1.406225 | -0.10657 | -0.27618 | -0.25583 | -0.00686 | -0.00204 |
| F | 0.074725 | 0.195745 | 1.017196 | -4.1196 | -1.17104 | 0.028912 | 0.07775 | 0.075033 | 0.000772 | 1.94E-04 |
| G | -0.01848 | -0.07337 | -0.32306 | 1.553035 | 0.355149 |  |  | -0.00912 | -3.58E-05 | -7.95E-06 |

FIG. 10

|  | RADIUS OF CURVATURE | THICKNESS/ DISTANCE | REFRACTIVE INDEX | ABBE NUMBER | EFFECTIVE RADIUS |
|---|---|---|---|---|---|
| S1 | 1.492178 | 0.406657 | 1.5441 | 56 | 1 |
| S2 | 1.588306 | 0.29359 |  |  | 0.945228 |
| S3 | 1.774457 | 0.660517 | 1.5441 | 56 | 0.953285 |
| S4 | −8.40671 | 0 |  |  | 0.902318 |
| S5 | 7.30999 | 3.37E−01 | 1.6398 | 23 | 0.878878 |
| S6 | 2.252106 | 5.81E−01 |  |  | 0.955376 |
| S7 | −5.17391 | 5.77E−01 | 1.6398 | 23 | 1.062827 |
| S8 | −5.39293 | 0.253655 |  |  | 1.447408 |
| S9 | 1.675266 | 0.497853 | 1.5343 | 55 | 2.085255 |
| S10 | 1.211316 | 0.252715 |  |  | 2.3759 |
| S11 | 1.00E+18 | 0.21 | 1.5167 | 64 | 2.674961 |
| S12 | 1.00E+18 | 0.642028 |  |  | 2.735019 |
| IMAGE PLANE | 1.00E+18 | 0.007954 |  |  | 3.034575 |

FIG. 14

|   | S1       | S2       | S3       | S4       | S5       | S6       | S7       | S8       | S9       | S10      |
|---|----------|----------|----------|----------|----------|----------|----------|----------|----------|----------|
| K | -0.76502 | -1.2795  | 0.062358 | 69.70393 | 0.999922 | -0.58346 | -49.3003 | 5.420856 | -9.9787  | -4.95889 |
| A | -0.00849 | -0.01851 | -0.0265  | -0.18086 | -0.17808 | 0.010864 | -0.08982 | -0.21196 | -0.3173  | -0.16469 |
| B | -0.0075  | -0.04382 | -0.00293 | 0.481523 | 0.368957 | -0.03404 | 0.070124 | 0.383029 | 0.22242  | 0.09533  |
| C | -0.05039 | -0.08796 | -0.20314 | -1.11338 | -0.80696 | 0.126124 | -0.28693 | -0.54045 | -0.11711 | -0.0408  |
| D | 0.097929 | 0.284635 | 0.534898 | 1.808303 | 1.478669 | -0.1022  | 0.395438 | 0.479602 | 0.044267 | 0.011201 |
| E | -0.12702 | -0.48364 | -0.84478 | -1.74423 | -1.65922 | 0.046677 | -0.3092  | -0.26304 | -0.0102  | -0.00188 |
| F | 0.079992 | 0.41953  | 0.712656 | 0.925982 | 1.072033 | -0.02105 | 0.086047 | 0.079244 | 0.001257 | 1.73E-04 |
| G | -0.01881 | -0.13351 | -0.21784 | -0.17593 | -0.3207  |          |          | -0.00988 | -6.36E-05 | -6.72E-06 |

FIG. 15

| | RADIUS OF CURVATURE | THICKNESS/ DISTANCE | REFRACTIVE INDEX | ABBE NUMBER | EFFECTIVE RADIUS |
|---|---|---|---|---|---|
| S1 | 1.479745 | 0.40523 | 1.5441 | 56 | 1 |
| S2 | 1.581441 | 0.296413 | | | 0.95988 |
| S3 | 1.784402 | 0.636276 | 1.5441 | 56 | 0.965528 |
| S4 | -8.39369 | 0.04 | | | 0.915807 |
| S5 | 8.37065 | 3.17E-01 | 1.6398 | 23 | 0.894906 |
| S6 | 2.401662 | 5.80E-01 | | | 0.970677 |
| S7 | -4.74647 | 6.33E-01 | 1.6398 | 23 | 1.07079 |
| S8 | -5.16562 | 0.195615 | | | 1.494337 |
| S9 | 1.661816 | 0.495811 | 1.5343 | 55 | 2.117697 |
| S10 | 1.208029 | 0.260266 | | | 2.400358 |
| S11 | 1.00E+18 | 0.21 | 1.5167 | 64 | 2.687885 |
| S12 | 1.00E+18 | 0.641088 | | | 2.746097 |
| IMAGE PLANE | 1.00E+18 | 0.008912 | | | 3.035402 |

FIG. 19

| | S1 | S2 | S3 | S4 | S5 | S6 | S7 | S8 | S9 | S10 |
|---|---|---|---|---|---|---|---|---|---|---|
| K | -0.77058 | -1.25627 | 0.068851 | 69.7524 | 0.99479 | -0.47023 | -49.2457 | 5.302455 | -10.4032 | -4.65985 |
| A | -0.00837 | -0.01851 | -0.0312 | -0.13952 | -0.1499 | 0.004254 | -0.07339 | -0.19592 | -0.3005 | -0.16567 |
| B | -0.00531 | -0.03737 | 0.002343 | 0.216918 | 0.210969 | 0.004371 | 0.02326 | 0.352553 | 0.201713 | 0.095083 |
| C | -0.05491 | -0.09474 | -0.20482 | -0.37193 | -0.4223 | 0.056413 | -0.20407 | -0.48165 | -0.10081 | -0.03997 |
| D | 0.097369 | 0.298459 | 0.52809 | 0.639285 | 1.123693 | -0.01109 | 0.311454 | 0.408894 | 0.036596 | 0.010784 |
| E | -0.1189 | -0.51409 | -0.79489 | -0.65602 | -1.74702 | -0.02882 | -0.2596 | -0.21247 | -0.00817 | -0.00177 |
| F | 0.068565 | 0.442829 | 0.63961 | 0.336706 | 1.412589 | 0.00534 | 0.073778 | 0.06031 | 0.00098 | 1.60E-04 |
| G | -0.01451 | -0.13975 | -0.18394 | -0.02218 | -0.47346 | | | -0.00706 | -4.83E-05 | -6.03E-06 |

FIG. 20

|  | RADIUS OF CURVATURE | THICKNESS/ DISTANCE | REFRACTIVE INDEX | ABBE NUMBER | EFFECTIVE RADIUS |
|---|---|---|---|---|---|
| S1 | 1.46359 | 0.428131 | 1.5441 | 56 | 1.05 |
| S2 | 1.573918 | 0.323696 |  |  | 0.961708 |
| S3 | 1.799853 | 0.612148 | 1.5441 | 56 | 0.938624 |
| S4 | −8.34639 | 0 |  |  | 0.872844 |
| STOP | 1.00E+18 | 4.00E−02 |  |  | 0.84 |
| S6 | 8.133099 | 3.09E−01 | 1.6398 | 23 | 0.848329 |
| S7 | 2.373571 | 5.59E−01 |  |  | 0.928903 |
| S8 | −4.82581 | 0.637666 | 1.6398 | 23 | 1.056715 |
| S9 | −4.58379 | 0.201523 |  |  | 1.473262 |
| S10 | 1.664743 | 0.471095 | 1.5343 | 55 | 2.114167 |
| S11 | 1.19E+00 | 0.261086 |  |  | 2.38817 |
| S12 | 1.00E+18 | 0.21 | 1.5167 | 64 | 2.675725 |
| S13 | 1.00E+18 | 0.637966 |  |  | 2.73514 |
| IMAGE PLANE | 1.00E+18 | 0.012034 |  |  | 3.035739 |

FIG. 24

| | S1 | S2 | S3 | S4 | S6 | S7 | S8 | S9 | S10 | S11 |
|---|---|---|---|---|---|---|---|---|---|---|
| K | -0.70156 | -1.11298 | 0.08101 | 89.2538 | -0.99762 | -0.47927 | -38.9726 | 3.459676 | -10.7812 | -4.70478 |
| A | -0.0059 | -0.01428 | -0.03173 | -0.14323 | -0.15015 | 0.003874 | -0.06691 | -0.1914 | -0.29959 | -0.16516 |
| B | -0.0008 | -0.02592 | 0.004738 | 0.216823 | 0.212177 | 0.004004 | 0.024854 | 0.353873 | 0.2018 | 0.094516 |
| C | -0.05377 | -0.08939 | -0.20564 | -0.37009 | -0.41979 | 0.053264 | -0.20739 | -0.48279 | -0.1008 | -0.03993 |
| D | 0.098859 | 0.295738 | 0.527769 | 0.640807 | 1.125383 | -0.00992 | 0.310241 | 0.408532 | 0.036588 | 0.010792 |
| E | -0.11783 | -0.51803 | -0.79395 | -0.65819 | -1.74803 | -0.02754 | -0.2596 | -0.21246 | -0.00817 | -0.00177 |
| F | 0.067387 | 0.443054 | 0.638111 | 0.336706 | 1.412589 | 0.00534 | 0.073778 | 0.060352 | 0.00098 | 1.60E-04 |
| G | -0.01496 | -0.13975 | -0.18394 | -0.02218 | -0.47346 | | | -0.00706 | -4.83E-05 | -6.08E-06 |

FIG. 25

LENS MODULE

CROSS-REFERENCE TO RELATED APPLICATION

This application claims the benefit of Korean Patent Application No. 10-2014-0023268 filed on Feb. 27, 2014, with the Korean Intellectual Property Office, the disclosure of which is incorporated in entirety herein by reference.

BACKGROUND

The present disclosure relates to a lens module having an optical system composed of five lenses.

In general, a camera for a portable terminal includes a lens module and an image pickup device (or an imaging device).

Here, the lens module includes a plurality of lenses, and the plurality of lenses constitutes an optical system projecting an image of a subject onto the imaging device. An element such as a charge-coupled device (CCD), or the like, is used as the imaging device, and in general, the imaging device has a pixel size equal to or greater than 1.4 μm.

Meanwhile, as portable terminals and cameras have been reduced in size, the sizes of pixels of imaging devices have been reduced to 1.12 μm or smaller, and thus, the development a lens module having a low F No. of 2.3 or less, able to implement high resolution even under such conditions is required.

SUMMARY

Some embodiments of the present disclosure may provide a lens module capable of implementing high resolution.

According to some embodiments of the present disclosure, a lens module may include: a first lens having positive refractive power and having a convex object-side surface and a concave image-side surface; a second lens having refractive power and having two convex surfaces; a third lens having refractive power and having a convex object-side surface; a fourth lens having refractive power; and a fifth lens having refractive power and having a convex object-side surface.

The fifth lens has one or more inflection points formed on an image-side surface thereof.

The lens module may satisfy the following conditional expression:

$39 < (ANG*ImgH)/(Fno*TTL) < 52$    [Conditional expression]

In the conditional expression above, ANG is a field of view (or an angle of view) of the optical system composed of the first to fifth lenses, ImgH is a diagonal length of an imaging surface, Fno is a constant (F No.) representing brightness of the optical system, and TTL is a distance from an object-side surface of the first lens to the imaging surface.

The lens module may satisfy the following conditional expression:

$0.33 < r1/f < 0.39$    [Conditional expression]

In the conditional expression above, r1 is a radius of curvature of the object-side surface of the first lens and f is an overall focal length of the optical system composed of the first to fifth lenses.

The lens module may satisfy the following conditional expression:

$0.36 < r2/f < 0.41$    [Conditional expression]

In the conditional expression above, r2 is a radius curvature of the image-side surface of the first lens and f is an overall focal length of the optical system composed of the first to fifth lenses.

The lens module may satisfy the following conditional expression:

$0.43 < r3/f < 0.47$    [Conditional expression]

In the conditional expression above, r3 is a radius curvature of the object-side surface of the second lens and f is an overall focal length of the optical system composed of the first to fifth lenses.

The lens module may satisfy the following conditional expression:

$0.65 < TTL/ImgH < 0.85$    [Conditional expression]

In the conditional expression above, TTL is a distance from an object-side surface of the first lens to an imaging surface, and ImgH is a diagonal length of the imaging surface.

The lens module may satisfy the following conditional expression:

$Fno < 2.3$    [Conditional expression]

In the conditional expression above, Fno is a constant representing brightness of the optical system composed of the first to fifth lenses.

The lens module may satisfy the following conditional expression:

$31 < ANG/Fno$    [Conditional expression]

In the conditional expression above, ANG is a field of view of the optical system composed of the first to fifth lenses and Fno is a constant representing brightness of the optical system.

The lens module may satisfy the following conditional expression:

$V4 < 27$    [Conditional expression]

In the conditional expression above, V4 is the Abbe number of the fourth lens.

The lens module may satisfy the following conditional expression:

$0.6 < 2*L51ER/ImgH < 0.8$    [Conditional expression]

In the conditional expression above, L51ER is a radius of an effective area refracting incident light from an object-side surface of the fifth lens, and ImgH is a diagonal length of an imaging surface.

The lens module may satisfy the following conditional expression:

$25 < V1 - V3$    [Conditional expression]

In the conditional expression above, V1 is the Abbe number of the first lens and V3 is the Abbe number of the third lens.

The lens module may satisfy the following conditional expression:

$4.0 < f1/f$    [Conditional expression]

In the conditional expression above, f1 is a focal length of the first lens and f is an overall focal length of the optical system composed of the first to fifth lenses.

The lens module may satisfy the following conditional expression:

$0.5 < f2/f < 1.5$    [Conditional expression]

In the conditional expression above, f2 is a focal length of the second lens and f is an overall focal length of the optical system composed of the first to fifth lenses.

The lens module may satisfy the following conditional expression:

$|f3/f|<2.0$ [Conditional expression]

In the conditional expression above, f3 is a focal length of the third lens and f is an overall focal length of the optical system composed of the first to fifth lenses.

The lens module may satisfy the following conditional expression:

$TTL/f<1.5$ [Conditional expression]

In the conditional expression above, TTL is a distance from an object-side surface of the first lens to an imaging surface and f is an overall focal length of the optical system composed of the first to fifth lenses.

The lens module may satisfy the following conditional expression:

$|TTL/f2|<1.9$ [Conditional expression]

In the conditional expression above, TTL is a distance from an object-side surface of the first lens to an imaging surface and f2 is a focal length of the second lens.

The lens module may satisfy the following conditional expression:

$|TTL/f3|<1.0$ [Conditional expression]

In the conditional expression above, TTL is a distance from an object-side surface of the first lens to an imaging surface and f3 is a focal length of the third lens.

The lens module may satisfy the following conditional expression:

$|TTL/f4|<1.7$ [Conditional expression]

In the conditional expression above, TTL is a distance from an object-side surface of the first lens to an imaging surface and f4 is a focal length of the fourth lens.

The lens module may satisfy the following conditional expression:

$5.0<f1/f2$ [Conditional expression]

In the conditional expression above, f1 is a focal length of the first lens and f2 is a focal length of the second lens.

The lens module may satisfy the following conditional expression:

$0.3<|f2/f3|<1.0$ [Conditional expression]

In the conditional expression above, f2 is a focal length of the second lens and f3 is a focal length of the third lens.

The lens module may satisfy the following conditional expression:

$|f3/f4|<1.7$ [Conditional expression]

In the conditional expression above, f3 is a focal length of the third lens and f4 is a focal length of the fourth lens.

The lens module may satisfy the following conditional expression:

$1.0<|f4/f5|$ [Conditional expression]

In the conditional expression above, f4 is a focal length of the fourth lens and f5 is a focal length of the fifth lens.

The lens module may satisfy the following conditional expression:

$1.0<|f1/f3|<5.0$ [Conditional expression]

In the conditional expression above, f1 is a focal length of the first lens and f3 is a focal length of the third lens.

The lens module may satisfy the following conditional expression:

$|f1/f4|<7.0$ [Conditional expression]

In the conditional expression above, f1 is a focal length of the first lens and f4 is a focal length of the fourth lens.

The lens module may satisfy the following conditional expression:

$0.9<|f1/f5|$ [Conditional expression]

In the conditional expression above, f1 is a focal length of the first lens and f5 is a focal length of the fifth lens.

The lens module may satisfy the following conditional expression:

$0.2<BFL/f$ [Conditional expression]

In the conditional expression above, BFL is a distance from an image-side surface of the fifth lens to an imaging surface and f is an overall focal length of the optical system composed of the first to fifth lenses.

The lens module may satisfy the following conditional expression:

$0.01<D12/f$ [Conditional expression]

In the conditional expression above, D12 is a distance from an image-side surface of the first lens to an object-side surface of the second lens and f is an overall focal length of the optical system composed of the first to fifth lenses.

The lens module may satisfy the following conditional expression:

$|r4/f|<3.0$ [Conditional expression]

In the conditional expression above, r4 is a radius of curvature of an image-side surface of the second lens and f is an overall focal length of the optical system composed of the first to fifth lenses.

The lens module may satisfy the following conditional expression:

$1.0<|r5/f|$ [Conditional expression]

In the conditional expression above, r5 is a radius of curvature of an object-side surface of the third lens and f is an overall focal length of the optical system composed of the first to fifth lenses.

The lens module may satisfy the following conditional expression:

$0.5<|r6/f|$ [Conditional expression]

In the conditional expression above, r6 is a radius of curvature of an image-side surface of the third lens and f is an overall focal length of the optical system composed of the first to fifth lenses.

The lens module may satisfy the following conditional expression:

$1.0<|r7/f|$ [Conditional expression]

In the conditional expression above, r7 is a radius of curvature of an object-side surface of the fourth lens and f is an overall focal length of the optical system composed of the first to fifth lenses.

The lens module may satisfy the following conditional expression:

$1.0<|r8/f|$ [Conditional expression]

In the conditional expression above, r8 is a radius of curvature of an image-side surface of the fourth lens and f is an overall focal length of the optical system composed of the first to fifth lenses.

The lens module may satisfy the following conditional expression:

$0.3 < |r9/f|$ [Conditional expression]

In the conditional expression above, r9 is a radius of curvature of an object-side surface of the fifth lens and f is an overall focal length of the optical system composed of the first to fifth lenses.

The lens module may satisfy the following conditional expression:

$0.2 < |r10/f|$ [Conditional expression]

In the conditional expression above, r10 is a radius of curvature of an image-side surface of the fifth lens and f is an overall focal length of the optical system composed of the first to fifth lenses.

The lens module may satisfy the following conditional expression:

$5.0 < D12/D23$ [Conditional expression]

In the conditional expression above, D12 is a distance from an image-side surface of the first lens to an object-side surface of the second lens and D23 is a distance from an image-side surface of the second lens to an object-side surface of the third lens.

The lens module may satisfy the following conditional expression:

$D23/D34 < 0.1$ [Conditional expression]

In the conditional expression above, D23 is a distance from an image-side surface of the second lens to an object-side surface of the third lens and D34 is a distance from an image-side surface of the third lens to an object-side surface of the fourth lens.

The lens module may satisfy the following conditional expression:

$D34/D45 < 3.0$ [Conditional expression]

In the conditional expression above, D34 is a distance from an image-side surface of the third lens to an object-side surface of the fourth lens and D45 is a distance from an image-side surface of the fourth lens to an object-side surface of the fifth lens.

The lens module may further include a stop disposed in front of the object-side of the first lens or an object-side of the third lens.

According to another aspect of the present disclosure, a lens module may include: a first lens having positive refractive power and having a convex object-side surface and a concave image-side surface; a second lens having refractive power and having two convex surfaces; a third lens having refractive power and having a convex object-side surface; a fourth lens having refractive power; and a fifth lens having refractive power and having one or more inflection points formed on an image-side surface thereof, wherein the fifth lens satisfies the following conditional expression:

$0.09 < IP521/L52ER < 0.12$ [Conditional expression]

In the conditional expression above, IP521 is a radius from the optical axis to an inflection point, among inflection points formed on an image-side surface of the fifth lens, formed in a position closest to the optical axis and L52ER is a radius of an effective area refracting incident light from the image-side surface of the fifth lens.

The lens module may satisfy the following conditional expression:

$0.36 < 2*IP512/ImgH < 0.61$ [Conditional expression]

In the conditional expression above, IP512 is a radius from optical axis to an inflection point, among inflection points formed on an object-side surface of the fifth lens, formed in a position second-closest to the optical axis and ImgH is a diagonal length of an imaging surface.

The lens module may satisfy the following conditional expression:

$0.07 < 2*IP521/ImgH < 0.10$ [Conditional expression]

In the conditional expression above, IP521 is a radius from the optical axis to an inflection point, among inflection points formed on an image-side surface of the fifth lens, formed in a position closest to the optical axis and ImgH is a diagonal length of an imaging surface.

The lens module may satisfy the following conditional expression:

$0.08 < IP511/L51ER < 0.11$ [Conditional expression]

In the conditional expression above, IP511 is a radius from the optical axis to an inflection point, among inflection points formed on the object-side surface of the fifth lens, formed in a position closest to the optical axis and L51ER is a radius of an effective area refracting incident light from an object-side surface of the fifth lens.

The lens module may satisfy the following conditional expression:

$0.58 < IP512/L51ER < 0.84$ [Conditional expression]

In the conditional expression above, IP512 is a radius from optical axis to an inflection point, among inflection points formed on the object-side surface of the fifth lens, formed in a position second-closest to the optical axis and L51ER is a radius of an effective area refracting incident light from an object-side surface of the fifth lens.

The lens module may satisfy the following conditional expression:

$0.05 < 2*IP511/ImgH < 0.08$ [Conditional expression]

In the conditional expression above, IP511 is a radius from the optical axis to an inflection point, among inflection points formed on the object-side surface of the fifth lens, formed in a position closest to the optical axis and ImgH is a diagonal length of an imaging surface.

According to another aspect of the present disclosure, a lens module may include: a first lens having refractive power; a second lens having refractive power; a third lens having refractive power; a fourth lens having refractive power; and a fifth lens having refractive power, having a convex object-side surface, and having an aspherical shape with four or more inflection points formed on the object-side surface thereof, wherein the lens module satisfies the following conditional expression:

$1.90 < L51ER < 2.65$ [Conditional expression]

In the conditional expression above, L51ER is a radius of an effective area refracting incident light from an object-side surface of the fifth lens.

The lens module may satisfy the following conditional expression:

$2.18 < L52ER < 2.95$ [Conditional Expression]

In the conditional expression above, L52ER is a radius of an effective area refracting incident light from an image-side surface of the fifth lens.

According to another aspect of the present disclosure, a lens module may include: first to fifth lenses disposed, starting from an object-side, in order and respectively having refractive power, wherein the fifth lens has an aspherical shape with a first concave point formed in a portion not intersecting an optical axis of an object-side surface thereof and a first convex point formed in a portion not intersecting an optical axis of an image-side surface thereof, and satisfies the following conditional expression:

$$0.93 < Pt1/CT5 < 1.38 \quad \text{[Conditional expression]}$$

In the conditional expression above, CT5 is a thickness at the center of the optical axis of the fifth lens and Pt1 is a thickness at the first concave point.

The lens module may satisfy the following conditional expression:

$$1.27 < Pt2/CT5 < 1.71 \quad \text{[Conditional expression]}$$

In the conditional expression above, CT5 is a thickness at the center of the optical axis of the fifth lens and Pt2 is a thickness at the first convex point.

The lens module may satisfy the following conditional expression:

$$0.56 < Pt1/Pt2 < 1.01 \quad \text{[Conditional expression]}$$

In the conditional expression above, Pt1 is a thickness at the first concave point and Pt2 is a thickness at the first convex point.

The lens module may satisfy the following conditional expression:

$$0.44 < Pt1 < 0.72 \quad \text{[Conditional expression]}$$

In the conditional expression above, Pt1 is a thickness at the first concave point.

The lens module may satisfy the following conditional expression:

$$0.61 < Pt2 < 0.87 \quad \text{[Conditional expression]}$$

In the conditional expression above, Pt2 is a thickness at the first convex point.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is a view illustrating a table illustrating characteristics of lenses illustrated in FIG. 1;

FIG. 5 is a table illustrating asphericity of the lens module illustrated in FIG. 1;

FIG. 9 is a view illustrating a table illustrating characteristics of lenses illustrated in FIG. 6;

FIG. 10 is a table illustrating asphericity of the lens module illustrated in FIG. 6;

FIG. 14 is a view illustrating a table illustrating characteristics of lenses illustrated in FIG. 11;

FIG. 15 is a table illustrating asphericity of the lens module illustrated in FIG. 11;

FIG. 19 is a view illustrating a table illustrating characteristics of lenses illustrated in FIG. 16;

FIG. 20 is a table illustrating asphericity of the lens module illustrated in FIG. 16;

FIG. 24 is a view illustrating a table illustrating characteristics of lenses illustrated in FIG. 21;

FIG. 25 is a table illustrating asphericity of the lens module illustrated in FIG. 21.

DETAILED DESCRIPTION

Figure 1:
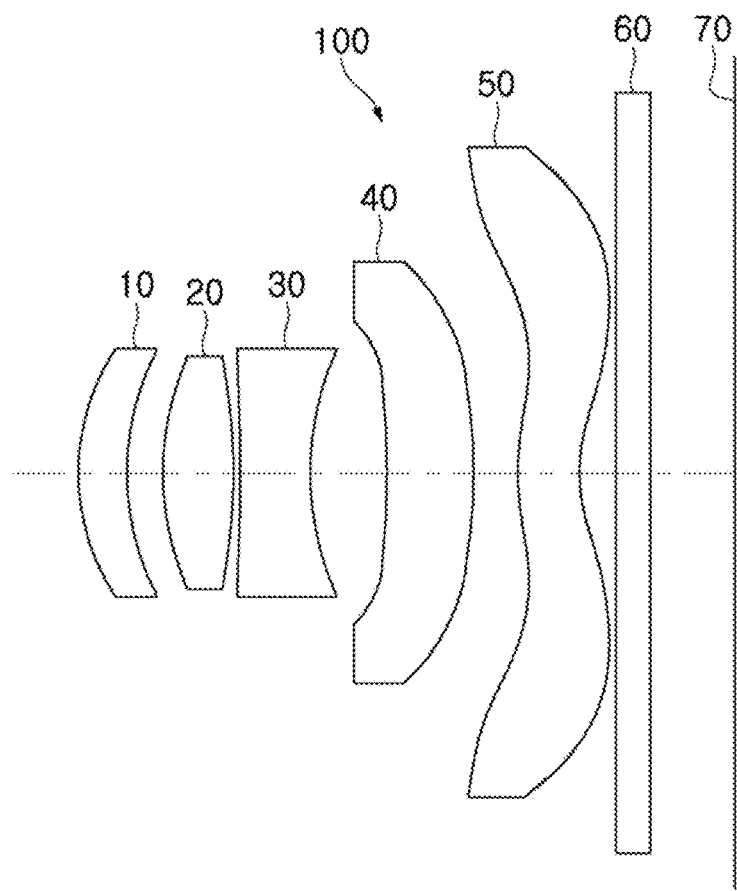
FIG. 1 is a view illustrating a configuration of a lens module according to a first exemplary embodiment of the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A first lens refers to a lens closest to an object, and a fifth lens refers to a lens closest to an image. Also, a front side refers to a side in a lens module close to the object, and a rear side refers to a side in the lens module close to an image sensor. Also, in each lens, a first surface refers to a surface close to an object (i.e., an object-side surface) and a second surface refers to a surface close to an image (i.e., an image-side surface). Also, in the present disclosure, units of a radius of curvature and a thickness of each lens, TTL, SL, IMGH, a total focal length of an optical system, and a focal length of each lens may be mm. The units may be altered as needed.

In addition, in descriptions of lens shapes, when one surface has a convex shape, it indicates that an optical axis of a corresponding surface is convex, and when one surface has a concave shape, it indicates that an optical axis of a corresponding surface is concave. Thus, even if it is described that one surface of a lens has a convex shape, edges of the lens may be concave. Similarly, even if it is described that one surface of a lens has a concave shape, edges of the lens may be convex. Also, thicknesses of lenses and distances between lenses indicated in the accompanying drawings and tables were measured based on an optical axis as the center.

Figure 2:
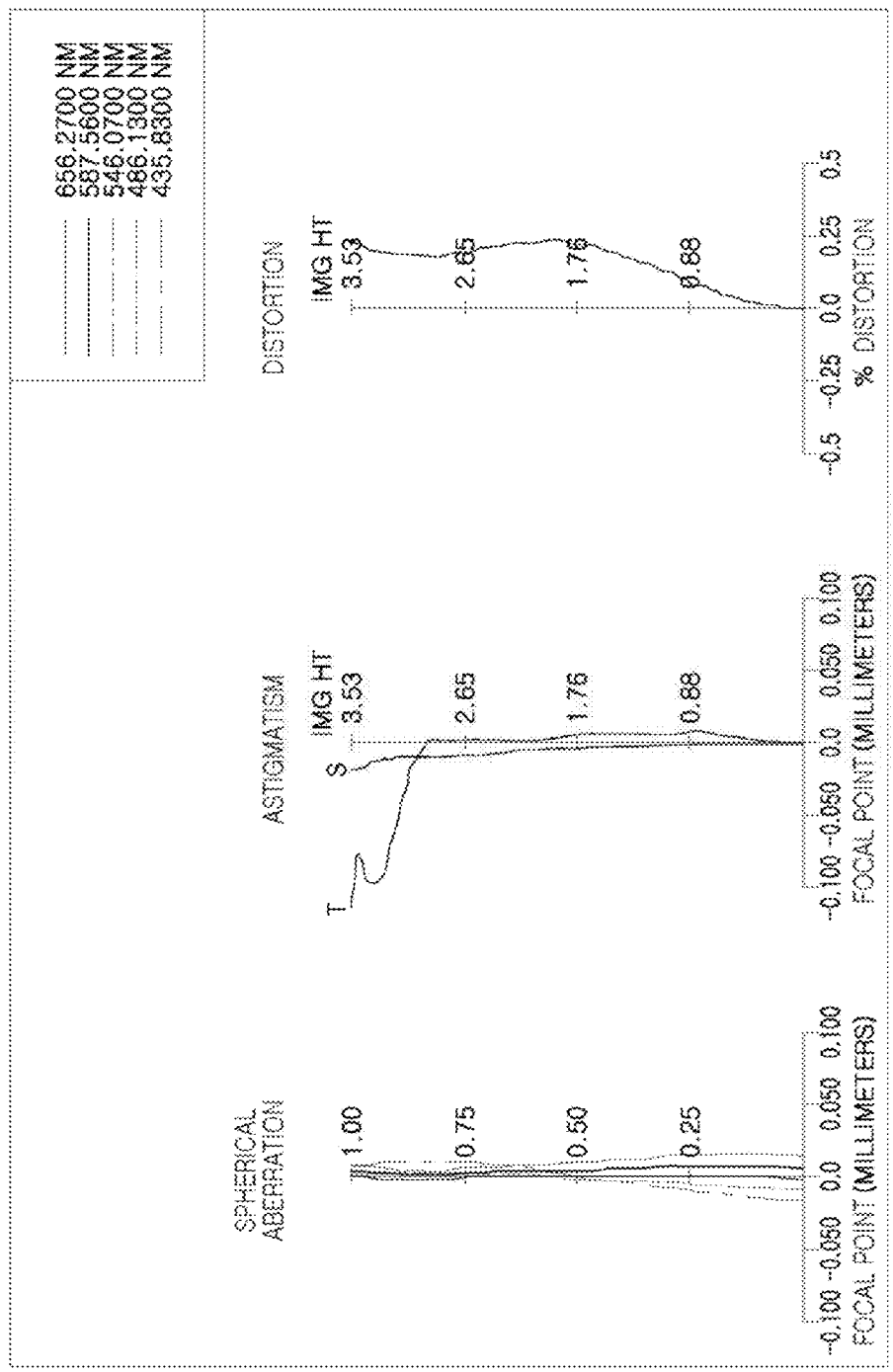
FIG. 2 is a graph including curves illustrating aberration characteristics of the lens module illustrated in FIG. 1.
Figure 3:
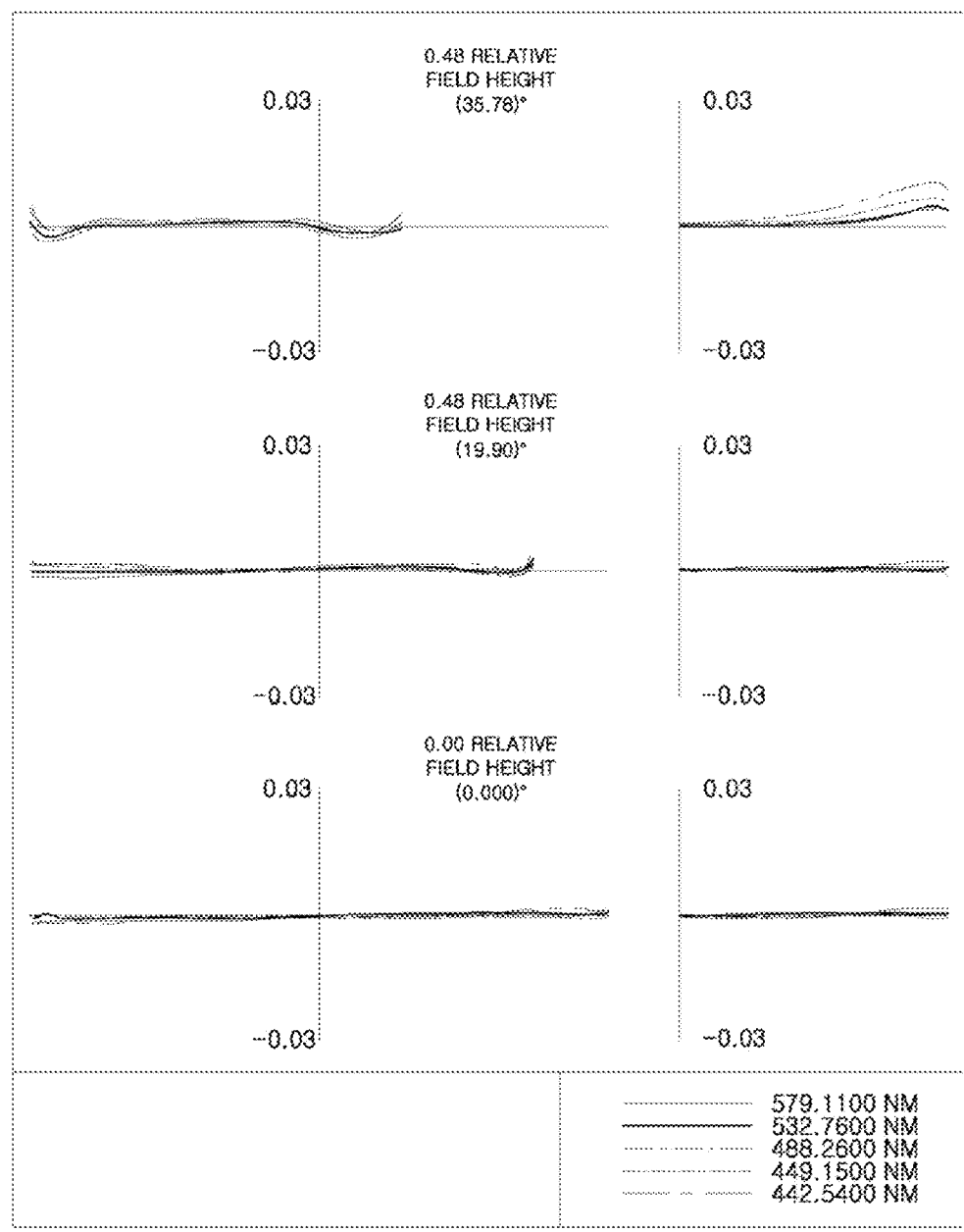
FIG. 3 is a graph illustrating coma aberration of the lens module illustrated in FIG. 1.
Figure 6:
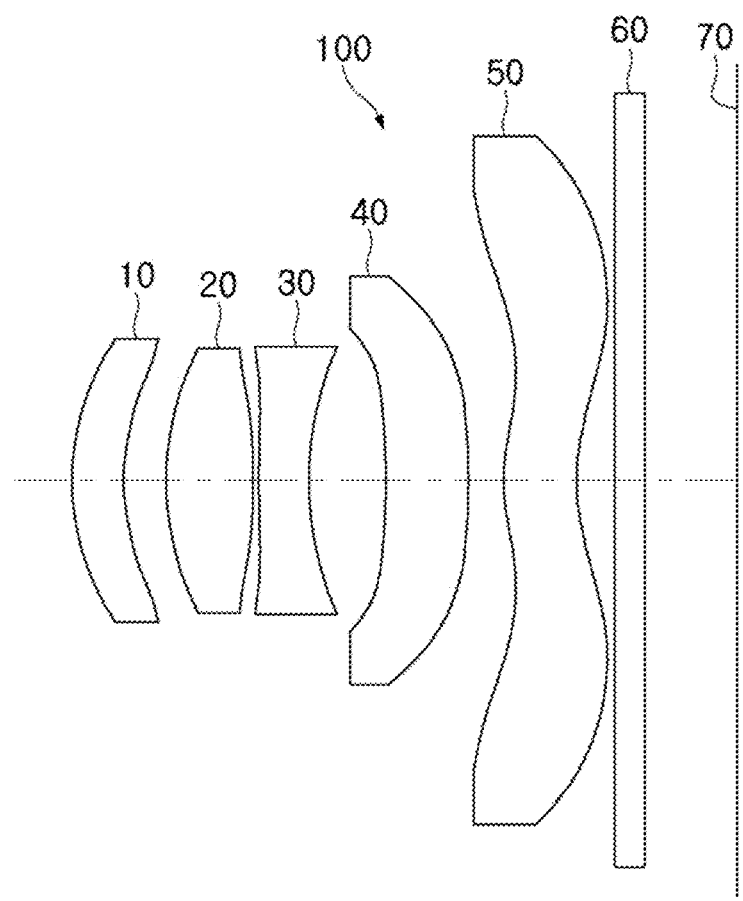
FIG. 6 is a view illustrating a configuration of a lens module according to a second exemplary embodiment of the present disclosure.
Figure 7:
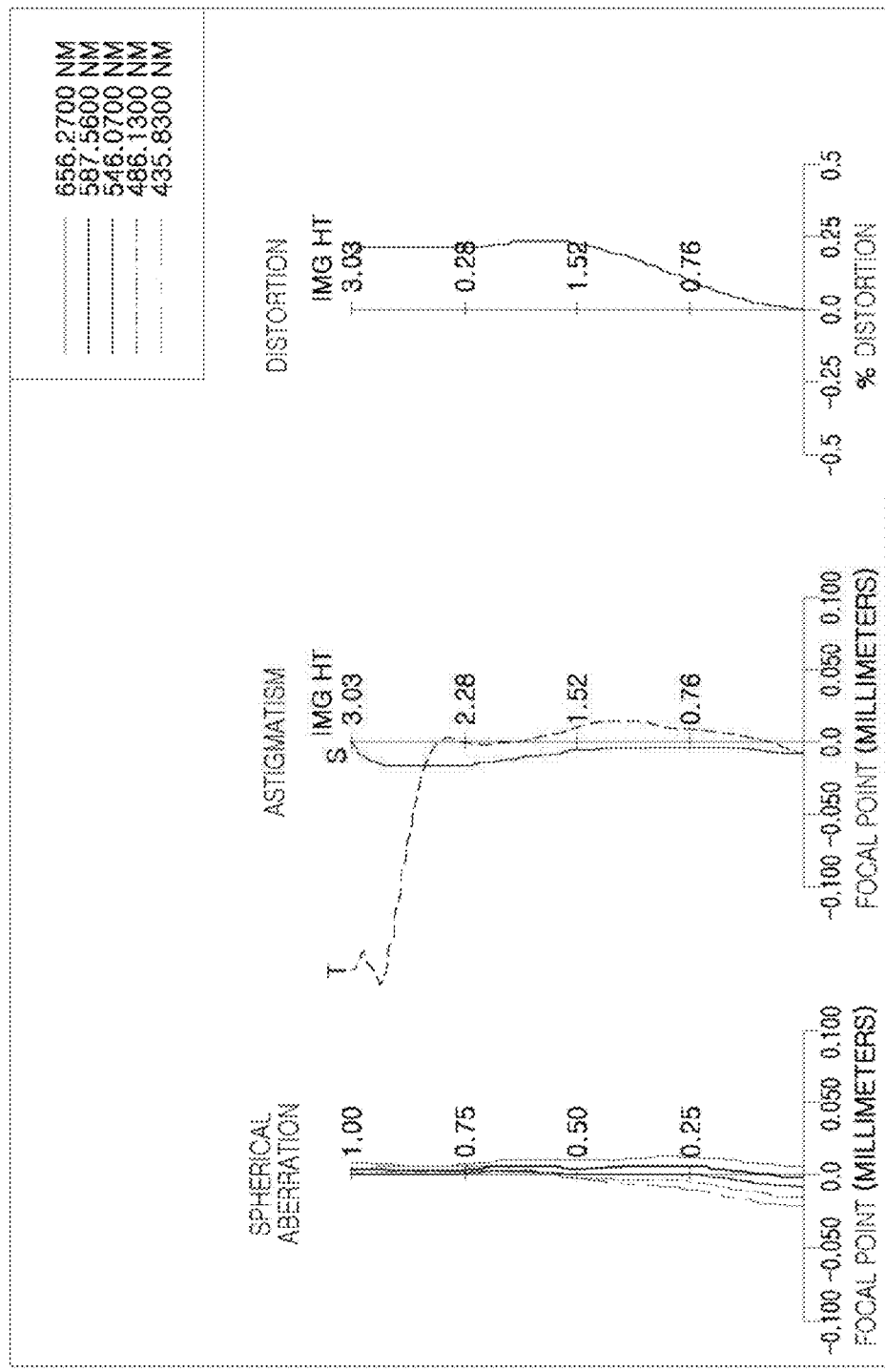
FIG. 7 is a graph including curves illustrating aberration characteristics of the lens module illustrated in FIG. 6.
Figure 8:
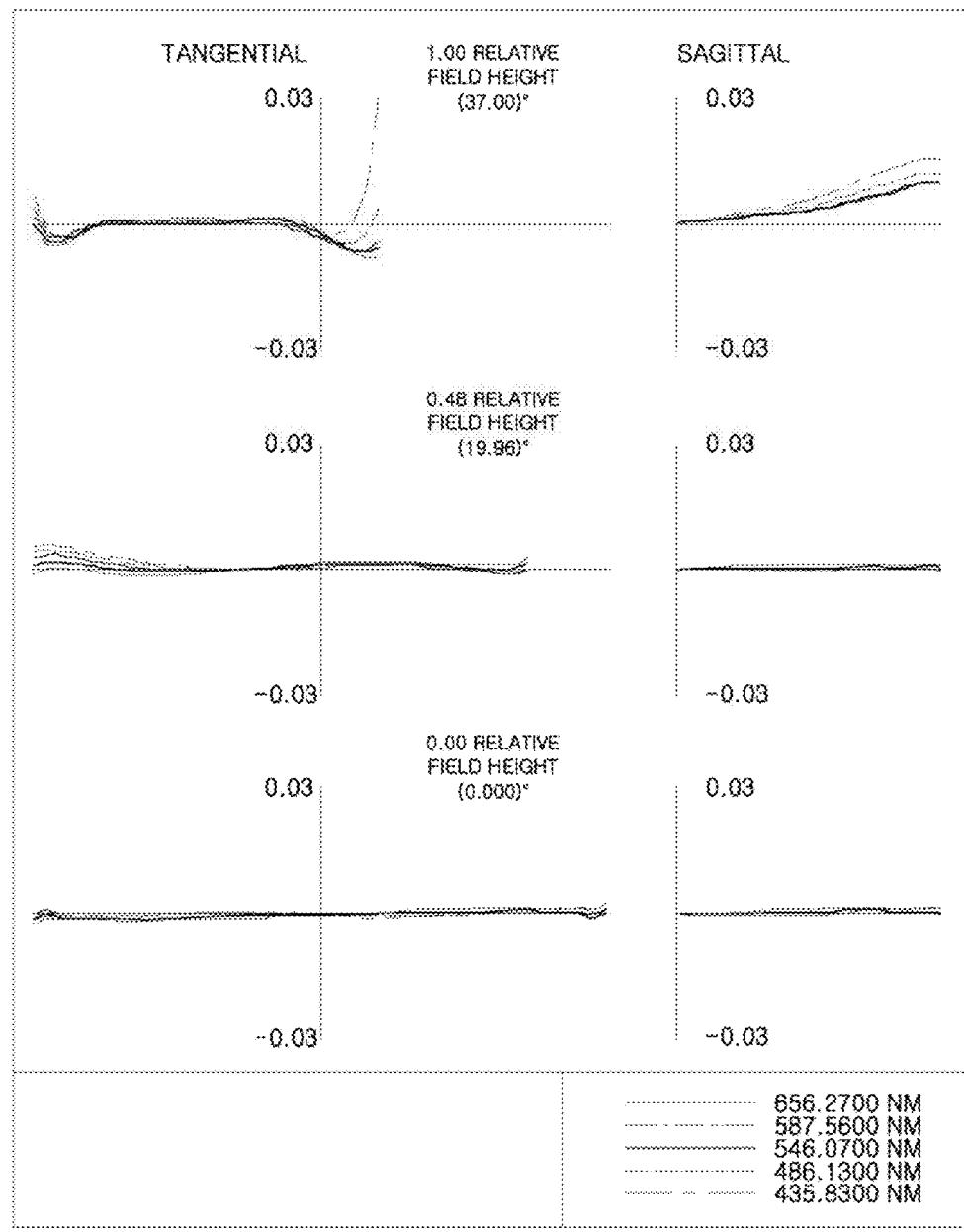
FIG. 8 is a graph illustrating coma aberration of the lens module illustrated in FIG. 6.
Figure 11:
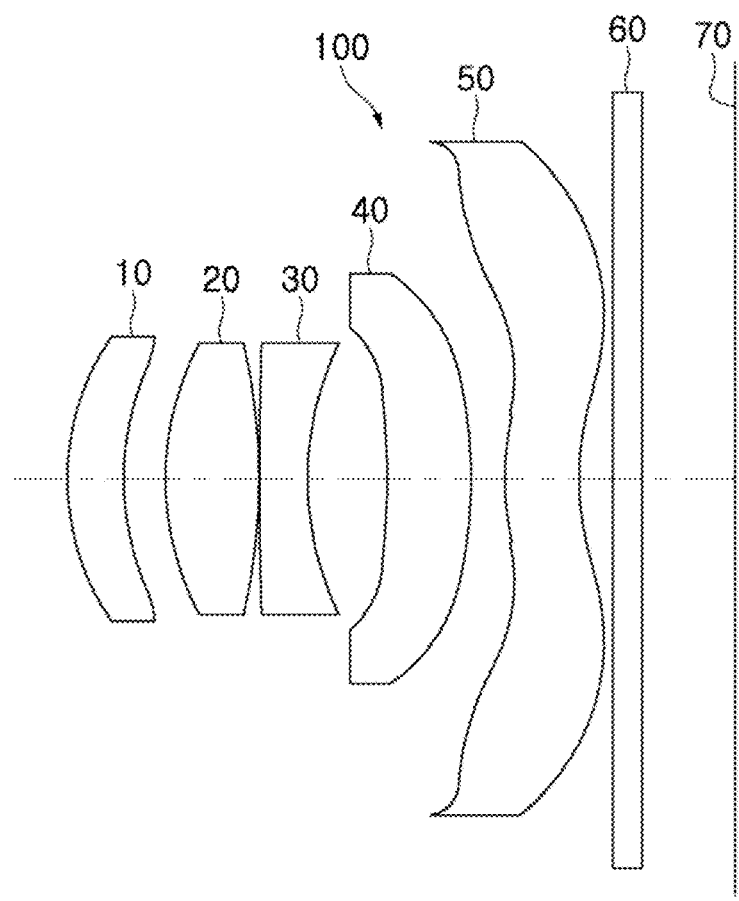
FIG. 11 is a view illustrating a configuration of a lens module according to a third exemplary embodiment of the present disclosure.
Figure 12:
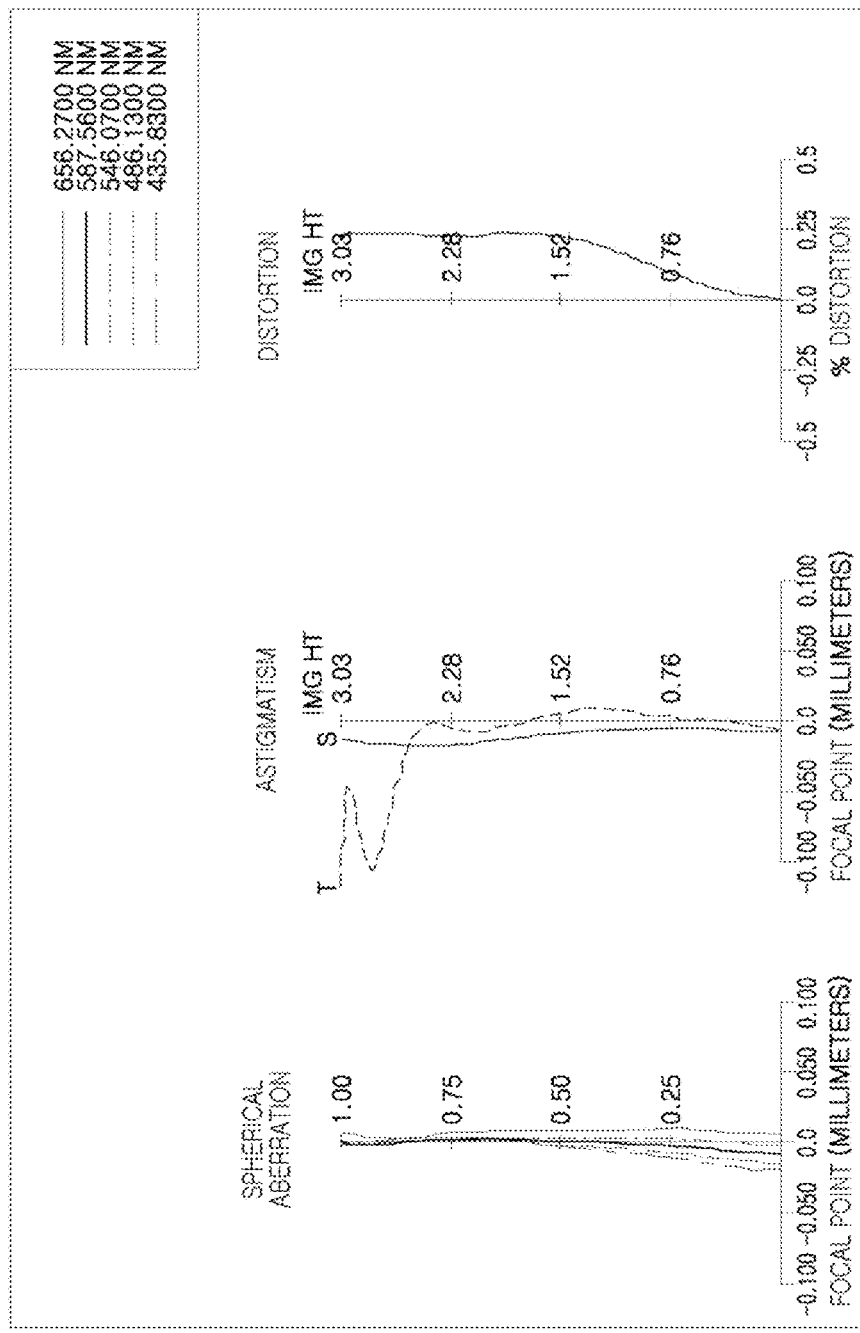
FIG. 12 is a graph including curves illustrating aberration characteristics of the lens module illustrated in FIG. 11.
Figure 13:
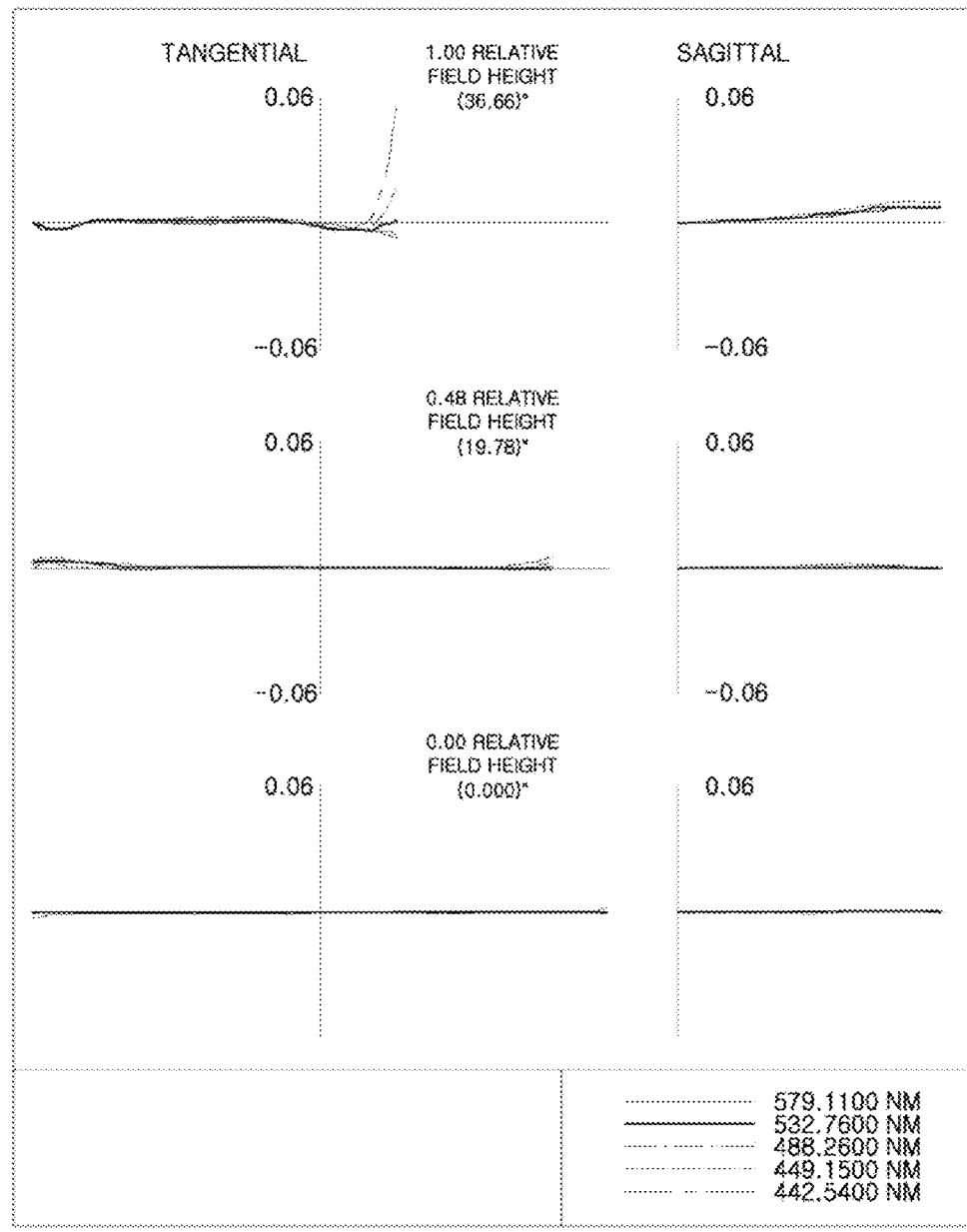
FIG. 13 is a graph illustrating coma aberration of the lens module illustrated in FIG. 11.
Figure 16:
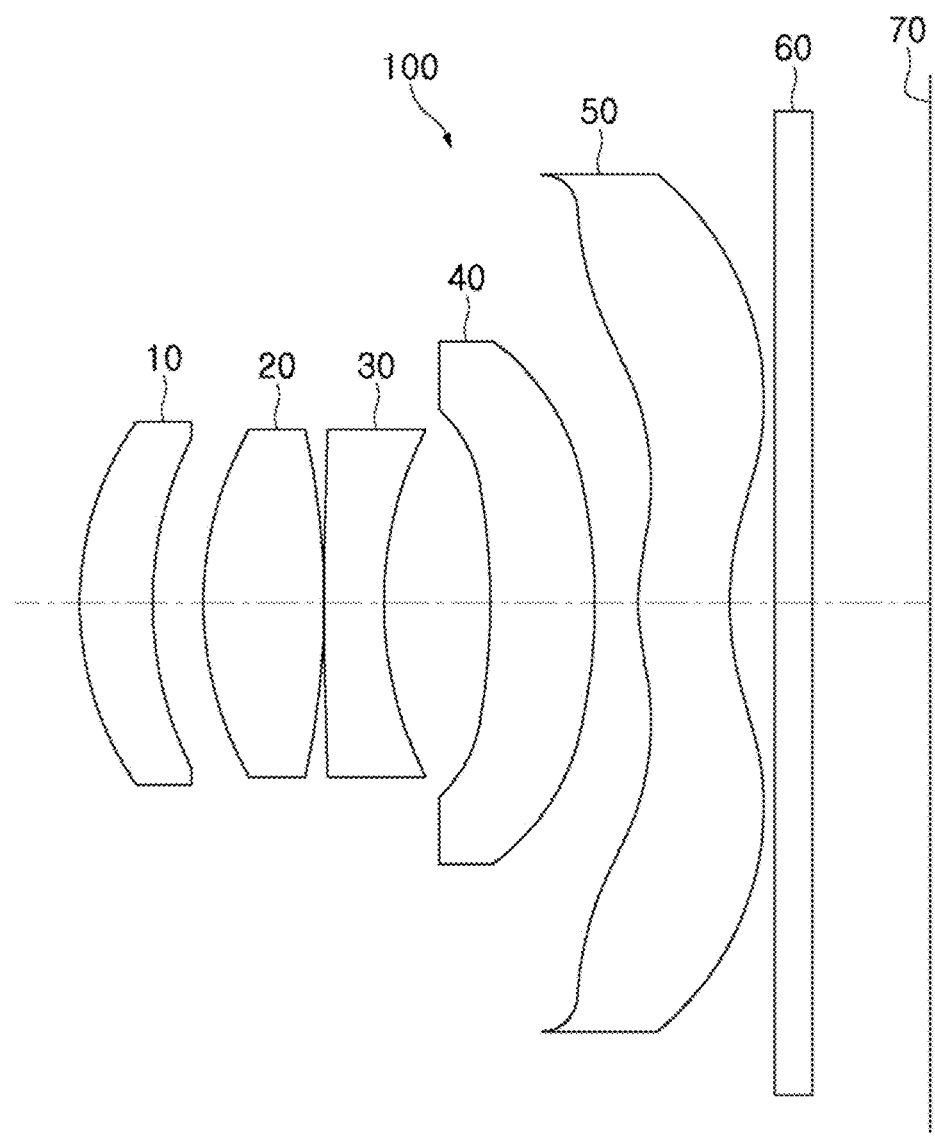
FIG. 16 is a view illustrating a configuration of a lens module according to a fourth exemplary embodiment of the present disclosure.
Figure 17:
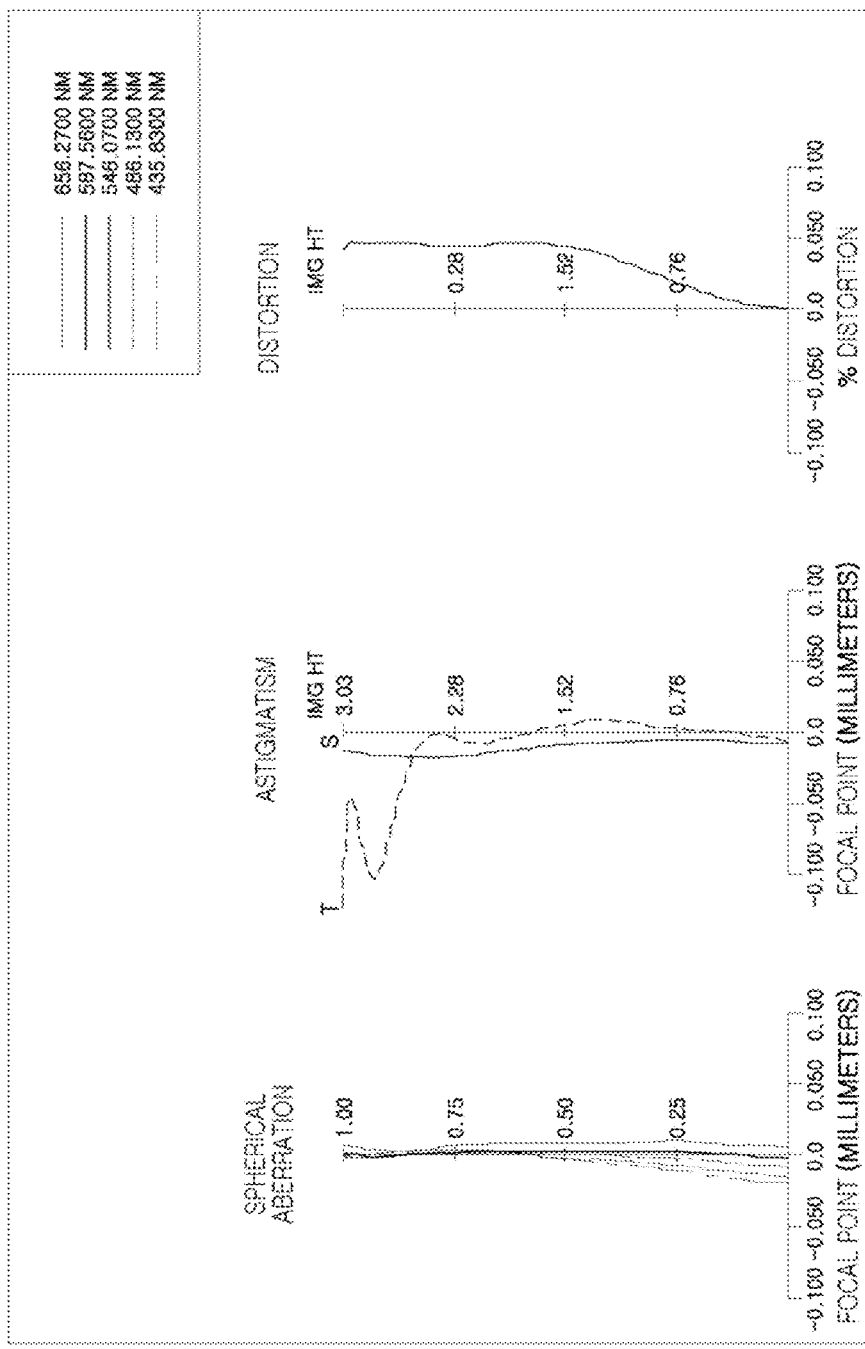
FIG. 17 is a graph including curves illustrating aberration characteristics of the lens module illustrated in FIG. 16.
Figure 18:
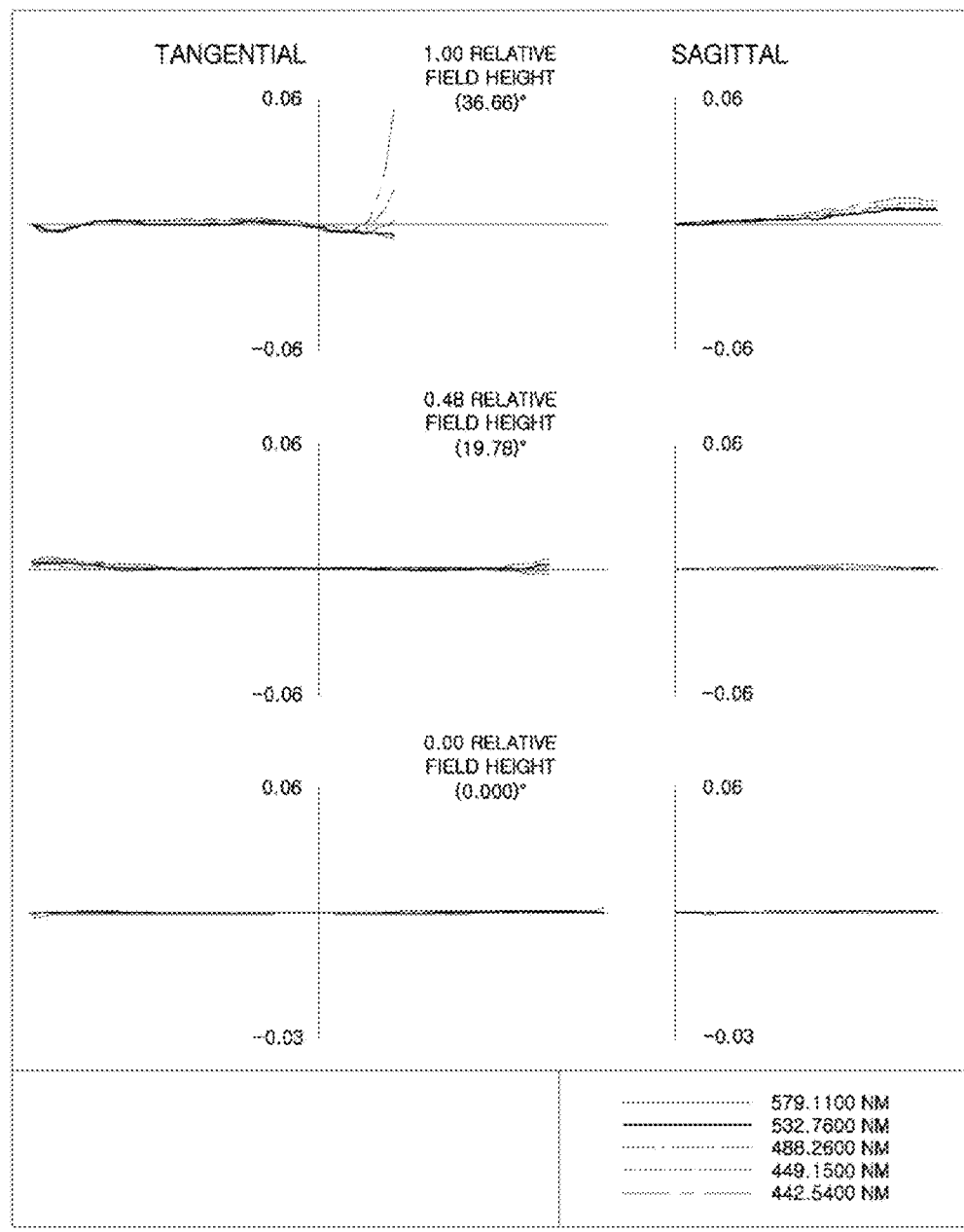
FIG. 18 is a graph illustrating coma aberration of the lens module illustrated in FIG. 16.
Figure 21:
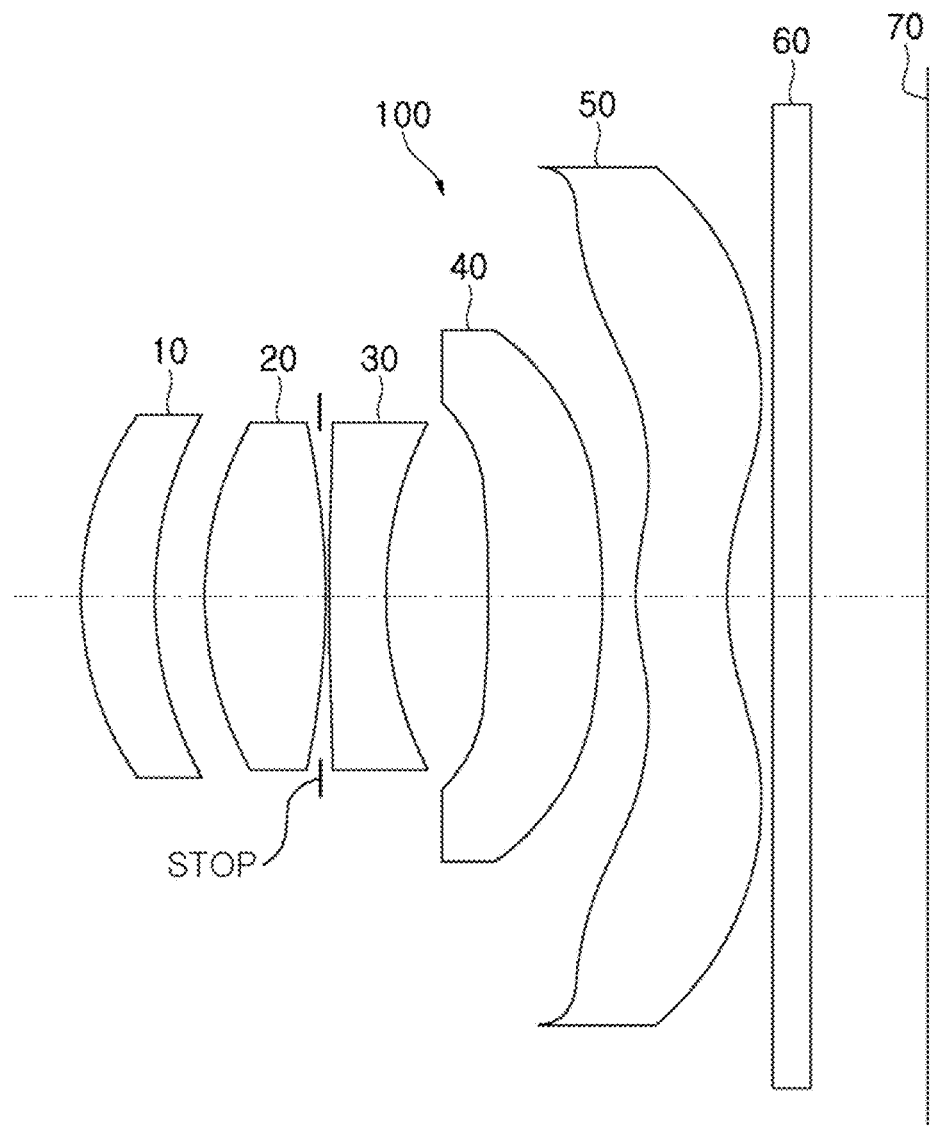
FIG. 21 is a view illustrating a configuration of a lens module according to a fifth exemplary embodiment of the present disclosure.
Figure 22:
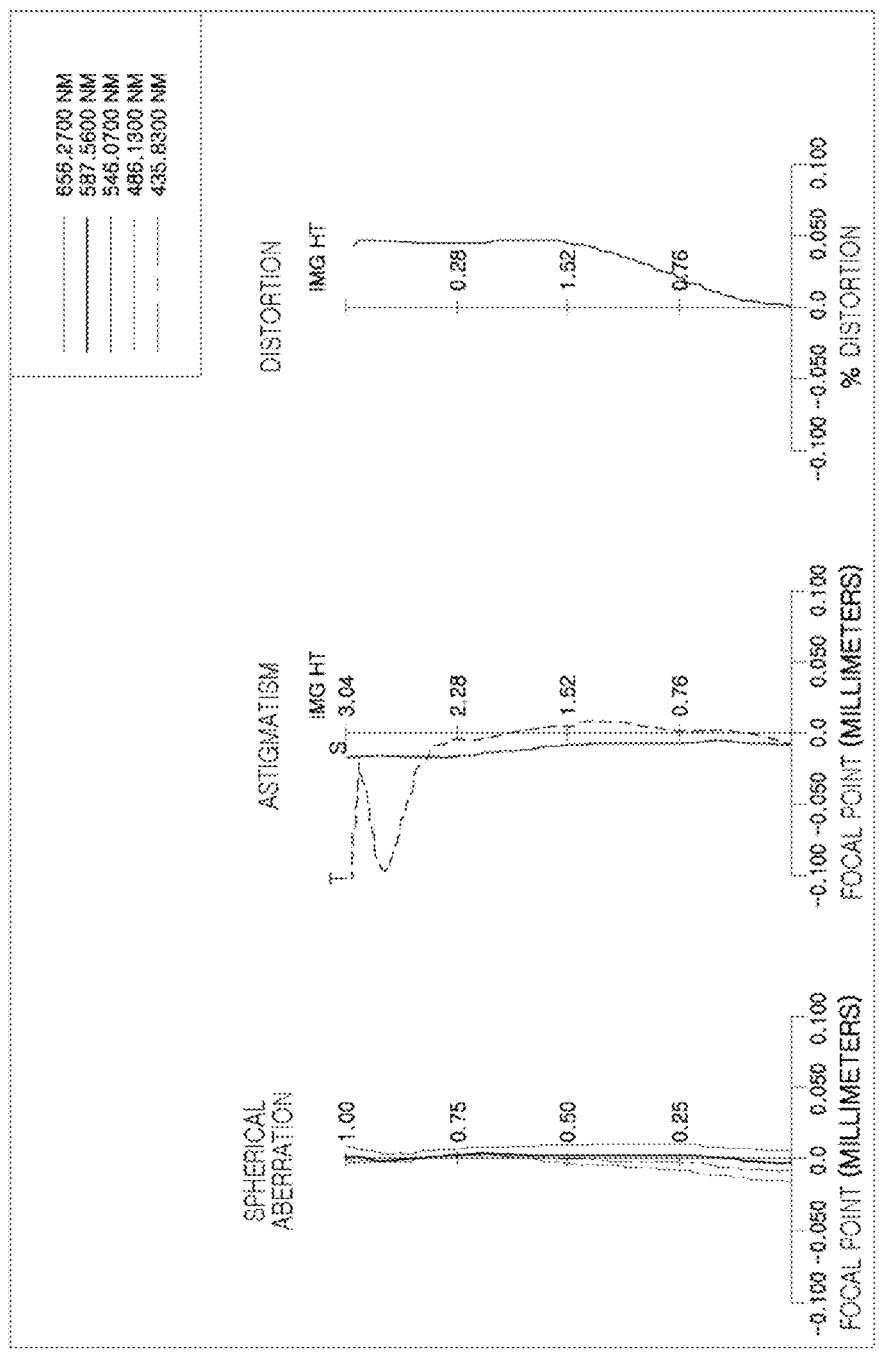
FIG. 22 is a graph including curves illustrating aberration characteristics of the lens module illustrated in FIG. 21.
Figure 23:
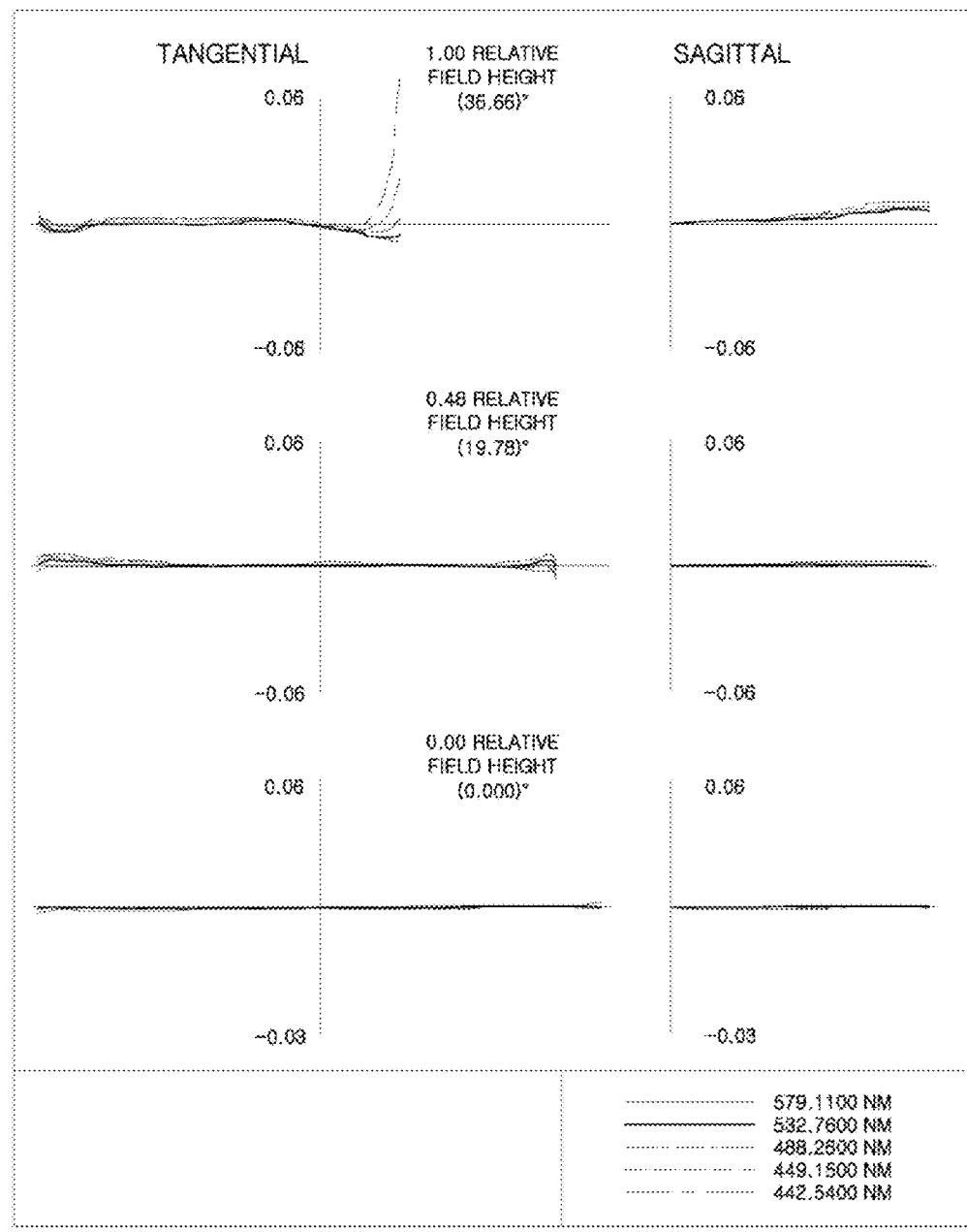
FIG. 23 is a graph illustrating coma aberration of the lens module illustrated in FIG. 21.
Figure 26:
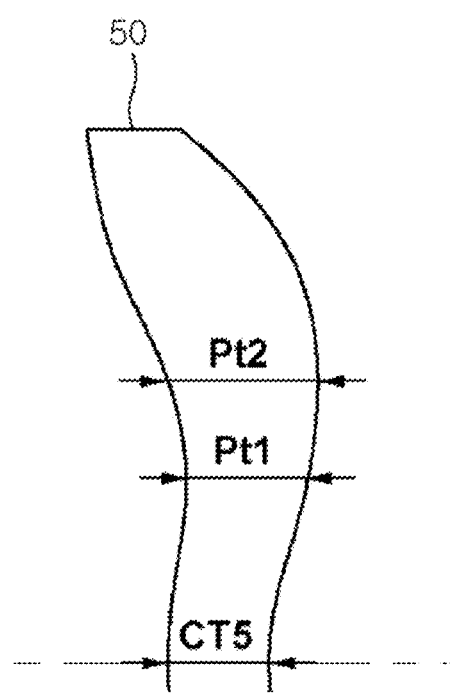
FIG. 26 is a partially enlarged view illustrating a concave point and a convex point of a fifth lens.

FIG. 1 is a view illustrating a configuration of a lens module according to a first exemplary embodiment of the present disclosure. FIG. 2 is a graph including curves illustrating aberration characteristics of the lens module illustrated in FIG. 1. FIG. 3 is a graph illustrating coma aberration of the lens module illustrated in FIG. 1. FIG. 4 is a view illustrating a table illustrating characteristics of lenses illustrated in FIG. 1. FIG. 5 is a table illustrating asphericity of the lens module illustrated in FIG. 1. FIG. 6 is a view illustrating a configuration of a lens module according to a second exemplary embodiment of the present disclosure. FIG. 7 is a graph including curves illustrating aberration characteristics of the lens module illustrated in FIG. 6. FIG. 8 is a graph illustrating coma aberration of the lens module illustrated in FIG. 6. FIG. 9 is a view illustrating a table illustrating characteristics of lenses illustrated in FIG. 6. FIG. 10 is a table illustrating asphericity of the lens module illustrated in FIG. 6. FIG. 11 is a view illustrating a configuration of a lens module according to a third exemplary embodiment of the present disclosure. FIG. 12 is a graph including curves illustrating aberration characteristics of the lens module illustrated in FIG. 11. FIG. 13 is a graph illustrating coma aberration of the lens module illustrated in FIG. 11. FIG. 14 is a view illustrating a table illustrating characteristics of lenses illustrated in FIG. 11. FIG. 15 is a table illustrating asphericity of the lens module illustrated in FIG. 11. FIG. 16 is a view illustrating a configuration of a lens module according to a fourth exemplary embodiment of the present disclosure. FIG. 17 is a graph including curves illustrating aberration characteristics of the lens module illustrated in FIG. 16. FIG. 18 is a graph illustrating coma aberration of the lens module illustrated in FIG. 16. FIG. 19 is a view illustrating a table illustrating characteristics of lenses illustrated in FIG. 16. FIG. 20 is a table illustrating asphericity of the lens module illustrated in FIG. 16. FIG. 21 is a view illustrating a configuration of a lens module according to a fifth exemplary embodiment of the present disclosure. FIG. 22 is a graph including curves illustrating aberration characteristics of the lens module illustrated in FIG. 21. FIG. 23 is a graph illustrating coma aberration of the lens module illustrated in FIG. 21. FIG. 24 is a view illustrating a table illustrating characteristics of lenses illustrated in FIG. 21. FIG. 25 is a table illustrating asphericity of the lens module illustrated in FIG. 21. FIG. 26 is a partially enlarged view illustrating a concave point and a convex point of a fifth lens.

A lens module according to an exemplary embodiment of the present disclosure may include an optical system composed of five lenses. Namely, the lens module according to the exemplary embodiment of the present disclosure may include a first lens, a second lens, a third lens, a fourth lens, and a fifth lens. However, the lens module according to the exemplary embodiment of the present disclosure may not only be composed of five lenses and may further include any other components as needed. For example, the lens module may include a stop (aperture) for adjusting a quantity of light. The lens module may further include an infrared (IR) cutoff filter for cutting off infrared rays. Also, the lens module may further include an image sensor (i.e., an imaging element) for converting an image of a subject made incident through an optical system into an electrical signal. Also, the lens module may further include a space maintaining member for adjusting a distance between lenses.

The first to fifth lenses constituting an optical system according to the exemplary embodiment of the present disclosure may be formed of plastic. At least one of the first to fifth lenses may have an aspherical surface. Also, the first to fifth lenses may respectively have at least one aspherical surface. For example, at least one of first and second surfaces of the first to fifth lenses may be an aspherical surface. Here, the aspherical surface of each lens may be expressed as Equation 1.

$$Z = \frac{cY^2}{1+\sqrt{1-(1+K)c^2Y^2}} + AY^4 + BY^6 + CY^8 + DY^{10} + EY^{12} + FY^{14} + \ldots$$ [Equation 1]

Here, Z is a distance from a vertex of a lens in a direction toward an optical axis, Y is a distance in a direction perpendicular to an optical axis, c is a reciprocal number of a radius of curvature r at the vertex of a lens, K is a conic constant, and A, B, C, D, E, and F are asphericity.

A lens module according to an exemplary embodiment of the present disclosure may include an optical system composed of five lenses. Namely, the lens module according to the exemplary embodiment of the present disclosure may include a first lens, a second lens, a third lens, a fourth lens, and a fifth lens. However, the lens module according to the exemplary embodiment of the present disclosure may not only be composed of five lenses and may further include any other components as needed. For example, the lens module may include a stop (aperture) for adjusting a quantity of light. The lens module may further include an infrared (IR) cutoff filter for cutting off infrared rays. Also, the lens module may further include an image sensor (i.e., an imaging element) for converting an image of a subject made incident through an optical system into an electrical signal. Also, the lens module may further include a space maintaining member for adjusting a distance between lenses.

The optical system of the lens module according to the exemplary embodiment of the present disclosure may have F No. equal to or less than 2.3. In this case, a subject may be imaged clearly. For example, the lens module according to the exemplary embodiment of the present disclosure may image a subject clearly under a low illuminance condition (e.g., below 100 lux).

Also, the lens module according to the exemplary embodiment of the present disclosure may include a stop disposed in front of an object-side of the first lens or an object-side of the third lens.

The lens module according to the exemplary embodiment of the present disclosure may satisfy the following conditional expression:

39<(ANG*ImgH)/(Fno*TTL)<52    [Conditional expression]

In the conditional expression above, ANG is a field of view (or an angle of view) of the optical system composed of the first to fifth lenses, ImgH is a diagonal length of an imaging surface, Fno is a constant (F No.) representing brightness of the optical system, and TTL is a distance from an object-side surface of the first lens to the imaging surface.

Also, the lens module according to the exemplary embodiment of the present disclosure may satisfy the following conditional expression:

0.33<r1/f<0.39    [Conditional expression]

In the conditional expression above, r1 is a radius of curvature of the object-side surface of the first lens and f is an overall focal length of the optical system composed of the first to fifth lenses.

Also, the lens module according to the exemplary embodiment of the present disclosure may satisfy the following conditional expression:

$0.36 < r2/f < 0.41$ [Conditional expression]

In the conditional expression above, r2 is a radius curvature of the image-side surface of the first lens and f is an overall focal length of the optical system composed of the first to fifth lenses.

Also, the lens module according to the exemplary embodiment of the present disclosure may satisfy the following conditional expression:

$0.43 < r3/f < 0.47$ [Conditional expression]

In the conditional expression above, r3 is a radius curvature of the object-side surface of the second lens and f is an overall focal length of the optical system composed of the first to fifth lenses.

Also, the lens module according to the exemplary embodiment of the present disclosure may satisfy the following conditional expression:

$0.65 < TTL/ImgH < 0.9$ [Conditional expression]

In the conditional expression above, TTL is a distance from an object-side surface of the first lens to an imaging surface, and ImgH is a diagonal length of the imaging surface).

Also, the lens module according to the exemplary embodiment of the present disclosure may satisfy the following conditional expression:

$0.65 < TTL/ImgH < 0.85$ [Conditional expression]

In the conditional expression above, TTL is a distance from an object-side surface of the first lens to an imaging surface, and ImgH is a diagonal length of the imaging surface.

Also, the lens module according to the exemplary embodiment of the present disclosure may satisfy the following conditional expression:

$Fno < 2.3$ [Conditional expression]

In the conditional expression above, Fno is a constant representing brightness of the optical system composed of the first to fifth lenses.

Also, the lens module according to the exemplary embodiment of the present disclosure may satisfy the following conditional expression:

$31 < ANG/Fno$ [Conditional expression]

In the conditional expression above, ANG is a field of view of the optical system composed of the first to fifth lenses and Fno is a constant representing brightness of the optical system.

Also, the lens module according to the exemplary embodiment of the present disclosure may satisfy the following conditional expression:

$V4 < 27$ [Conditional expression]

In the conditional expression above, V4 is the Abbe number of the fourth lens.

Also, the lens module according to the exemplary embodiment of the present disclosure may satisfy the following conditional expression:

$1.6 < n4$ [Conditional expression]

In the conditional expression above, n4 is a refractive index of the fourth lens.

Also, the lens module according to the exemplary embodiment of the present disclosure may satisfy the following conditional expression:

$25 < V1 - V3$ [Conditional expression]

In the conditional expression above, V1 is the Abbe number of the first lens and V3 is the Abbe number of the third lens.

Also, the lens module according to the exemplary embodiment of the present disclosure may satisfy the following conditional expression:

$V1 - V5 < 2$ [Conditional expression]

In the conditional expression above, V1 is the Abbe number of the first lens and V5 is the Abbe number of the fifth lens.

Also, the lens module according to the exemplary embodiment of the present disclosure may satisfy the following conditional expression:

$4.0 < f1/f$ [Conditional expression]

In the conditional expression above, f1 is a focal length of the first lens and f is an overall focal length of the optical system composed of the first to fifth lenses.

Also, the lens module according to the exemplary embodiment of the present disclosure may satisfy the following conditional expression:

$0.5 < f2/f < 1.5$ [Conditional expression]

In the conditional expression above, f2 is a focal length of the second lens and f is an overall focal length of the optical system composed of the first to fifth lenses.

Also, the lens module according to the exemplary embodiment of the present disclosure may satisfy the following conditional expression:

$|f3/f| < 2.0$ [Conditional expression]

In the conditional expression above, f3 is a focal length of the third lens and f is an overall focal length of the optical system composed of the first to fifth lenses.

Also, the lens module according to the exemplary embodiment of the present disclosure may satisfy the following conditional expression:

$0.5 < |f4/f|$ [Conditional expression]

In the conditional expression above, f4 is a focal length of the fourth lens and f is an overall focal length of the optical system composed of the first to fifth lenses.

Also, the lens module according to the exemplary embodiment of the present disclosure may satisfy the following conditional expression:

$0.3 < |f5/f|$ [Conditional expression]

In the conditional expression above, f5 is a focal length of the fifth lens and f is an overall focal length of the optical system composed of the first to fifth lenses.

Also, the lens module according to the exemplary embodiment of the present disclosure may satisfy the following conditional expression:

$TTL/f < 1.5$ [Conditional expression]

In the conditional expression above, TTL is a distance from an object-side surface of the first lens to an imaging surface and f is an overall focal length of the optical system composed of the first to fifth lenses.

Also, the lens module according to the exemplary embodiment of the present disclosure may satisfy the following conditional expression:

$0.2 < |TTL/f1|$ [Conditional expression]

In the conditional expression above, TTL is a distance from an object-side surface of the first lens to an imaging surface and f1 is a focal length of the first lens.

Also, the lens module according to the exemplary embodiment of the present disclosure may satisfy the following conditional expression:

$|TTL/f2| < 1.9$ [Conditional expression]

In the conditional expression above, TTL is a distance from an object-side surface of the first lens to an imaging surface and f2 is a focal length of the second lens.

Also, the lens module according to the exemplary embodiment of the present disclosure may satisfy the following conditional expression:

$|TTL/f3| < 1.0$ [Conditional expression]

In the conditional expression above, TTL is a distance from an object-side surface of the first lens to an imaging surface and f3 is a focal length of the third lens.

Also, the lens module according to the exemplary embodiment of the present disclosure may satisfy the following conditional expression:

$|TTL/f4| < 1.7$ [Conditional expression]

In the conditional expression above, TTL is a distance from an object-side surface of the first lens to an imaging surface and f4 is a focal length of the fourth lens.

Also, the lens module according to the exemplary embodiment of the present disclosure may satisfy the following conditional expression:

$|TTL/f5| < 2.1$ [Conditional expression]

In the conditional expression above, TTL is a distance from an object-side surface of the first lens to an imaging surface and f5 is a focal length of the fifth lens.

Also, the lens module according to the exemplary embodiment of the present disclosure may satisfy the following conditional expression:

$5.0 < f1/f2$ [Conditional expression]

In the conditional expression above, f1 is a focal length of the first lens and f2 is a focal length of the second lens.

Also, the lens module according to the exemplary embodiment of the present disclosure may satisfy the following conditional expression:

$0.3 < |f2/f3| < 1.0$ [Conditional expression]

In the conditional expression above, f2 is a focal length of the second lens and f3 is a focal length of the third lens.

Also, the lens module according to the exemplary embodiment of the present disclosure may satisfy the following conditional expression:

$|f3/f4| < 1.7$ [Conditional expression]

In the conditional expression above, f3 is a focal length of the third lens and f4 is a focal length of the fourth lens.

Also, the lens module according to the exemplary embodiment of the present disclosure may satisfy the following conditional expression:

$1.0 < |f4/f5|$ [Conditional expression]

In the conditional expression above, f4 is a focal length of the fourth lens and f5 is a focal length of the fifth lens.

Also, the lens module according to the exemplary embodiment of the present disclosure may satisfy the following conditional expression:

$1.0 < |f1/f3| < 5.0$ [Conditional expression]

In the conditional expression above, f1 is a focal length of the first lens and f3 is a focal length of the third lens.

Also, the lens module according to the exemplary embodiment of the present disclosure may satisfy the following conditional expression:

$|f1/f4| < 7.0$ [Conditional expression]

In the conditional expression above, f1 is a focal length of the first lens and f4 is a focal length of the fourth lens.

Also, the lens module according to the exemplary embodiment of the present disclosure may satisfy the following conditional expression:

$0.9 < |f1/f5|$ [Conditional expression]

In the conditional expression above, f1 is a focal length of the first lens and f5 is a focal length of the fifth lens.

Also, the lens module according to the exemplary embodiment of the present disclosure may satisfy the following conditional expression:

$0.2 < BFL/f$ [Conditional expression]

In the conditional expression above, BFL is a distance from an image-side surface of the fifth lens to an imaging surface and f is an overall focal length of the optical system composed of the first to fifth lenses.

Also, the lens module according to the exemplary embodiment of the present disclosure may satisfy the following conditional expression:

$0.01 < D12/f$ [Conditional expression]

In the conditional expression above, D12 is a distance from an image-side surface of the first lens to an object-side surface of the second lens and f is an overall focal length of the optical system composed of the first to fifth lenses.

Also, the lens module according to the exemplary embodiment of the present disclosure may satisfy the following conditional expression:

$|r4/f| < 3.0$ [Conditional expression]

In the conditional expression above, r4 is a radius of curvature of an image-side surface of the second lens and f is an overall focal length of the optical system composed of the first to fifth lenses.

Also, the lens module according to the exemplary embodiment of the present disclosure may satisfy the following conditional expression:

$1.0 < |r5/f|$ [Conditional expression]

In the conditional expression above, r5 is a radius of curvature of an object-side surface of the third lens and f is an overall focal length of the optical system composed of the first to fifth lenses.

Also, the lens module according to the exemplary embodiment of the present disclosure may satisfy the following conditional expression:

$0.5 < |r6/f|$ [Conditional expression]

In the conditional expression above, r6 is a radius of curvature of an image-side surface of the third lens and f is an overall focal length of the optical system composed of the first to fifth lenses.

Also, the lens module according to the exemplary embodiment of the present disclosure may satisfy the following conditional expression:

$1.0<|r7|/f$ [Conditional expression]

In the conditional expression above, r7 is a radius of curvature of an object-side surface of the fourth lens and f is an overall focal length of the optical system composed of the first to fifth lenses.

Also, the lens module according to the exemplary embodiment of the present disclosure may satisfy the following conditional expression:

$1.0<|r8|/f$ [Conditional expression]

In the conditional expression above, r8 is a radius of curvature of an image-side surface of the fourth lens and f is an overall focal length of the optical system composed of the first to fifth lenses.

Also, the lens module according to the exemplary embodiment of the present disclosure may satisfy the following conditional expression:

$0.3<|r9|/f$ [Conditional expression]

In the conditional expression above, r9 is a radius of curvature of an object-side surface of the fifth lens and f is an overall focal length of the optical system composed of the first to fifth lenses.

Also, the lens module according to the exemplary embodiment of the present disclosure may satisfy the following conditional expression:

$0.2<|r10|/f$ [Conditional expression]

In the conditional expression above, r10 is a radius of curvature of an image-side surface of the fifth lens and f is an overall focal length of the optical system composed of the first to fifth lenses.

Also, the lens module according to the exemplary embodiment of the present disclosure may satisfy the following conditional expression:

$5.0<D12/D23$ [Conditional expression]

In the conditional expression above, D12 is a distance from an image-side surface of the first lens to an object-side surface of the second lens and D23 is a distance from an image-side surface of the second lens to an object-side surface of the third lens.

The conditional expression may be conditions for optimizing a ratio of distributing refractive power of the first and second lenses. For example, refractive power of the second lens is advantageously designed not to exceed a lower limit value of the conditional expression.

Also, the lens module according to the exemplary embodiment of the present disclosure may satisfy the following conditional expression:

$D23/D34<0.1$ [Conditional expression]

In the conditional expression above, D23 is a distance from an image-side surface of the second lens to an object-side surface of the third lens and D34 is a distance from an image-side surface of the third lens to an object-side surface of the fourth lens.

The conditional expression may be conditions for optimizing a ratio of distributing refractive power of the second and third lenses. For example, refractive power of the third lens is advantageously designed not to exceed an upper limit value of the conditional expression.

Also, the lens module according to the exemplary embodiment of the present disclosure may satisfy the following conditional expression:

$D34/D45<3.0$ [Conditional expression]

In the conditional expression above, D34 is a distance from an image-side surface of the third lens to an object-side surface of the fourth lens and D45 is a distance from an image-side surface of the fourth lens to an object-side surface of the fifth lens.

The conditional expression may be conditions for optimizing a ratio of distributing refractive power of the third and fourth lenses. For example, refractive power of the fourth lens is advantageously designed not to exceed an upper limit value of the conditional expression.

Also, the lens module according to the exemplary embodiment of the present disclosure may satisfy the following conditional expression:

$0.6<2*L51ER/ImgH<0.8$ [Conditional expression]

In the conditional expression above, L51ER is a radius of an effective area refracting incident light from an object-side surface of the fifth lens and ImgH is a diagonal length of an imaging surface.

Also, the lens module according to the exemplary embodiment of the present disclosure may satisfy one or more of the following conditional expressions:

$0.36<2*IP512/ImgH<0.61$ [Conditional expression]

$0.07<2*IP521/ImgH<0.10$ [Conditional expression]

In the conditional expressions above, IP512 is a radius from optical axis to an inflection point, among inflection points formed on an object-side surface of the fifth lens, formed in a position second-closest to the optical axis, IP521 is a radius from the optical axis to an inflection point, among inflection points formed on an image-side surface of the fifth lens, formed in a position closest to the optical axis and ImgH is a diagonal length of an imaging surface.

The two conditional expressions may be conditions for optimizing a size of the fifth lens with respect to the diagonal length of the imaging surface. For example, effective radii of the object-side surface and the image-side surface of the fifth lens are designed to satisfy the foregoing conditional expressions to advantageously minimize a vignetting phenomenon.

Also, the lens module according to the exemplary embodiment of the present disclosure may satisfy one or more of the following conditional expressions:

$0.08<IP511/L51ER<0.11$ [Conditional expression]

$0.58<IP512/L51ER<0.84$ [Conditional expression]

$0.09<IP521/L52ER<0.12$ [Conditional expression]

In the conditional expressions above, IP511 is a radius from the optical axis to an inflection point among inflection points formed on the object-side surface of the fifth lens, formed in a position closest to the optical axis, IP512 is a radius from optical axis to an inflection point, among inflection points formed on the object-side surface of the fifth lens, formed in a position second-closest to the optical axis, IP521 is a radius from the optical axis to an inflection point among inflection points formed on the image-side surface of the fifth lens formed in a position closest to the optical axis, and L52ER is a radius of an effective area refracting incident light from the image-side surface of the fifth lens.

The three conditional expressions may be conditions advantageously projecting light refracted by the fifth lens evenly to an imaging surface. For example, the fifth lens satisfying the foregoing four conditional expressions refracts light made incident from the fourth lens according to a size of an imaging surface, advantageously implementing high resolution. In addition, the fifth lens satisfying the foregoing conditions may advantageously minimize aberration generated by the first to fourth lenses.

Also, the lens module according to the exemplary embodiment of the present disclosure may satisfy one or more of the following conditional expressions:

$1.90 < L51ER < 2.65$ [Conditional expression]

$2.18 < L52ER < 2.95$ [Conditional expression]

In the conditional expressions above, L51ER is a radius of an effective area refracting incident light from the object-side surface of the fifth lens and L52ER is a radius of an effective area refracting incident light from the image-side surface of the fifth lens.

The foregoing conditional expressions may be conditions for optimizing a size of the fifth lens. For example, the fifth lens satisfying one or more of the conditional expressions may be advantageously miniaturized.

Also, the lens module according to the exemplary embodiment of the present disclosure may satisfy one or more of the following conditional expressions:

$0.93 < Pt1/CT5 < 1.38$ [Conditional expression]

$1.27 < Pt2/CT5 < 1.71$ [Conditional expression]

$0.56 < Pt1/Pt2 < 1.01$ [Conditional expression]

$0.44 < Pt1 < 0.72$ [Conditional expression]

$0.61 < Pt2 < 0.87$ [Conditional expression]

In the conditional expressions above, CT5 is a thickness at the center of the optical axis of the fifth lens, Pt1 is a thickness at a first concave point, and Pt2 is a thickness at a first convex point.

The foregoing conditional expressions may be conditions for optimizing a distribution of refractive power of the fifth lens. For example, the fifth lens satisfying one or more of the conditional expressions may evenly project incident light to an imaging surface. In addition, the fifth lens satisfying one or more of the foregoing conditional expressions may minimize spherical aberration.

Hereinafter, the first to fifth lenses constituting the optical system according to the exemplary embodiment of the present disclosure will be described.

The first lens may have refractive power. For example, the first lens may have positive refractive power. A first surface of the first lens may be convex and a second surface thereof may be concave. For example, the first lens may have a meniscus shape, bulging toward an object-side. At least one of the first and second surfaces of the first lens may be an aspherical surface. For example, both surfaces of the first lens may be aspherical surfaces. The first lens may be formed of a material having a high degree of light transmittance and excellent processibility. For example, the first lens may be formed of plastic. However, a material of the first lens is not limited thereto. For example, the first lens may be formed of glass. The first lens may have generally low refractive power. For example, a focal length of the first lens may be 15 or greater.

The second lens may have refractive power. For example, the second lens may have positive refractive power. Also, the second lens may have refractive power higher than that of the first lens. For example, a focal length of the second lens may be shorter than that of the first lens. Both surfaces of the second lens may be convex. At least one of the first and second surfaces of the second lens may be an aspherical surface. For example, both surfaces of the second lens may be aspherical surfaces. The second lens may be formed of a material having a high degree of light transmittance and excellent processibility. For example, the second lens may be formed of plastic. However, a material of the second lens is not limited thereto. For example, the second lens may be formed of glass.

The third lens may have refractive power. For example, the third lens may have negative refractive power. A first surface of the third lens may be convex and a second surface thereof may be concave. At least one of the first and second surfaces of the third lens may be an aspherical surface. For example, both surfaces of the third lens may be aspherical surfaces. The third lens may be formed of a material having a high degree of light transmittance and excellent processibility. For example, the third lens may be formed of plastic. However, a material of the third lens is not limited thereto. For example, the third lens may be formed of glass. The third lens may be formed of a material having a high refractive index. For example, the third lens may be formed of a material having a refractive index equal to or greater than 1.6. The third lens having such characteristics is insensitive to manufacturing tolerance, so it may be easily manufactured.

The fourth lens may have refractive power. For example, the fourth lens may have positive or negative refractive power. A first surface of the fourth lens may be concave and a second surface thereof may be convex. For example, the fourth lens may have a meniscus shape, bulging toward an image-side. At least one of the first and second surfaces of the fourth lens may be an aspherical surface. For example, both surfaces of the fourth lens may be aspherical surfaces. The fourth lens may be formed of a material having a high degree of light transmittance and excellent processibility. For example, the fourth lens may be formed of plastic. However, a material of the fourth lens is not limited thereto. For example, the fourth lens may be formed of glass. The fourth lens may be formed of a material having a high refractive index. For example, the fourth lens may be formed of a material having a refractive index equal to or greater than 1.6. The fourth lens having such characteristics is insensitive to manufacturing tolerance, so it may be easily manufactured.

The fifth lens may have refractive power. For example, the fifth lens may have negative refractive power. A first surface of the fifth lens may be convex and a second surface thereof may be concave. At least one of the first and second surfaces of the fifth lens may be an aspherical surface. For example, both surfaces of the fifth lens may be aspherical surfaces. The fifth lens may be formed of a material having a high degree of light transmittance and excellent processibility. For example, the fifth lens may be formed of plastic. However, a material of the fifth lens is not limited thereto. For example, the fifth lens may be formed of glass. The fifth lens may have a shape having a plurality of inflection points. For example, two or more inflection points IP511 and IP512 may be formed on the object-side of the fifth lens. Also, two or more inflection points IP521 and IP522 may be formed on the image-side surface of the fifth lens. Here, the inflection points formed on both surfaces of the fifth lens may be formed to be adjacent to an optical axis in the following order. For example, the first inflection point IP511 formed on the object-side of the fifth lens may be positioned to be closest to the optical axis and the fourth inflection point IP522 formed on the image-side surface of the fifth lens may be formed to be farthest from the optical axis.

Optical axis-IP511-IP521-IP512-IP522

The lens module configured as described above may improve aberration, a factor degrading image quality. In addition, the lens module configured as described above may have enhanced resolution, and may facilitate reducing weight and lowering manufacturing costs.

A lens module according to a first exemplary embodiment of the present disclosure will be described with reference to FIGS. 1 through 5.

A lens module 100 according to the present exemplary embodiment may include an optical system composed of a first lens 10, a second lens 20, a third lens 30, a fourth lens 40, and a fifth lens 50, and may further include an infrared (IR) cutoff filter 60 and an image sensor 70. In addition, the lens module 100 according to the present exemplary embodiment may have F No. of 2.28 and may have a field of view (FOV) (or an angle of view) of 71.5 degrees.

In the present exemplary embodiment, the first lens 10 may have positive refractive power. A first surface of the first lens 10 may be convex and a second surface thereof may be concave. The second lens 20 may have positive refractive power. Both surfaces of the second lens 20 may be convex. The third lens 30 may have negative refractive power. A first surface of the third lens 30 may be convex and a second surface thereof may be concave. The fourth lens 40 may have positive refractive power. A first surface of the fourth lens 40 may be concave and a second surface thereof may be convex. The fifth lens 50 may have negative refractive power. A first surface of the fifth lens 50 may be convex and a second surface thereof may be concave. The fifth lens 50 may have an aspherical shape having a plurality of inflection points. For example, the first surface of the fifth lens 50 may have two or more inflection points. Also, the second surface of the fifth lens 50 may have two or more inflection points. The lens module 100 according to the present exemplary embodiment may include one or more stops ST. For example, the one or more stops ST may be disposed in front of the first lens 10.

The lens module configured in this manner may have aberration characteristics illustrated in FIGS. 2 and 3 and may have lens characteristics illustrated in FIGS. 4 and 5. For reference, FIG. 4 is a table showing radii of curvature, thicknesses and distances, refractive indices, Abbe numbers, and effective radii of lenses and FIG. 5 is a table showing aspherical values of lenses.

A lens module according to a second exemplary embodiment of the present disclosure will be described with reference to FIGS. 6 through 10.

A lens module 100 according to the present exemplary embodiment may include an optical system composed of a first lens 10, a second lens 20, a third lens 30, a fourth lens 40, and a fifth lens 50, and may further include an IR cutoff filter 60 and an image sensor 70. In addition, the lens module 100 according to the present exemplary embodiment may have F No. of 1.97 and may have an FOV of 74.0 degrees.

In the present exemplary embodiment, the first lens 10 may have positive refractive power. A first surface of the first lens 10 may be convex and a second surface thereof may be concave. The second lens 20 may have positive refractive power. Both surfaces of the second lens 20 may be convex. The third lens 30 may have negative refractive power. A first surface of the third lens 30 may be convex and a second surface thereof may be concave. The fourth lens 40 may have positive refractive power. A first surface of the fourth lens 40 may be concave and a second surface thereof may be convex. The fifth lens 50 may have negative refractive power. A first surface of the fifth lens 50 may be convex and a second surface thereof may be concave. The fifth lens 50 may have an aspherical shape having a plurality of inflection points. For example, the first surface of the fifth lens 50 may have two or more inflection points. Also, the second surface of the fifth lens 50 may have two or more inflection points. The lens module 100 according to the present exemplary embodiment may include one or more stops ST. For example, the one or more stops ST may be disposed in front of the first lens 10.

The lens module configured in this manner may have aberration characteristics illustrated in FIGS. 7 and 8 and may have lens characteristics illustrated in FIGS. 9 and 10. For reference, FIG. 9 is a table showing radii of curvature, thicknesses and distances, refractive indices, Abbe numbers, and effective radii of lenses and FIG. 10 is a table showing aspherical values of lenses.

A lens module according to a third exemplary embodiment of the present disclosure will be described with reference to FIGS. 11 through 15.

A lens module 100 according to the present exemplary embodiment may include an optical system composed of a first lens 10, a second lens 20, a third lens 30, a fourth lens 40, and a fifth lens 50, and may further include an IR cutoff filter 60 and an image sensor 70. In addition, the lens module 100 according to the present exemplary embodiment may have F No. of 1.99 and may have an FOV of 73.3 degrees.

In the present exemplary embodiment, the first lens 10 may have positive refractive power. A first surface of the first lens 10 may be convex and a second surface thereof may be concave. The second lens 20 may have positive refractive power. Both surfaces of the second lens 20 may be convex. The third lens 30 may have negative refractive power. A first surface of the third lens 30 may be convex and a second surface thereof may be concave. The fourth lens 40 may have positive refractive power. A first surface of the fourth lens 40 may be concave and a second surface thereof may be convex. The fifth lens 50 may have negative refractive power. A first surface of the fifth lens 50 may be convex and a second surface thereof may be concave. The fifth lens 50 may have an aspherical shape having a plurality of inflection points. For example, the first surface of the fifth lens 50 may have two or more inflection points. Also, the second surface of the fifth lens 50 may have two or more inflection points. The lens module 100 according to the present exemplary embodiment may include one or more stops ST. For example, the one or more stops ST may be disposed in front of the first lens 10.

The lens module configured in this manner may have aberration characteristics illustrated in FIGS. 12 and 13 and may have lens characteristics illustrated in FIGS. 14 and 15. For reference, FIG. 14 is a table showing radii of curvature, thicknesses and distances, refractive indices, Abbe numbers, and effective radii of lenses and FIG. 15 is a table showing aspherical values of lenses.

A lens module according to a fourth exemplary embodiment of the present disclosure will be described with reference to FIGS. 16 through 20.

A lens module 100 according to the present exemplary embodiment may include an optical system composed of a first lens 10, a second lens 20, a third lens 30, a fourth lens 40, and a fifth lens 50, and may further include an IR cutoff filter 60 and an image sensor 70. In addition, the lens module 100 according to the present exemplary embodiment may have F No. of 1.99 and may have an FOV of 73.4 degrees.

In the present exemplary embodiment, the first lens 10 may have positive refractive power. A first surface of the first lens 10 may be convex and a second surface thereof may be concave. The second lens 20 may have positive refractive power. Both surfaces of the second lens 20 may be convex. The third lens 30 may have negative refractive power. A first surface of the third lens 30 may be convex and a second surface thereof may be concave. The fourth lens 40 may have negative refractive power. A first surface of the fourth lens 40 may be concave and a second surface thereof may be convex. The fifth lens 50 may have negative refractive power. A first surface of the fifth lens 50 may be convex and a second surface thereof may be concave. The fifth lens 50 may have an aspherical shape having a plurality of inflection points. For example, the first surface of the fifth lens 50 may have two or more inflection points. Also, the second surface of the fifth lens 50 may have two or more inflection points. The lens module 100 according to the present exemplary embodiment may include one or more stops ST. For example, the one or more stops ST may be disposed in front of the first lens 10.

The lens module configured in this manner may have aberration characteristics illustrated in FIGS. 17 and 18 and may have lens characteristics illustrated in FIGS. 19 and 20. For reference, FIG. 19 is a table showing radii of curvature, thicknesses and distances, refractive indices, Abbe numbers, and effective radii of lenses and FIG. 20 is a table showing aspherical values of lenses.

A lens module according to a fifth exemplary embodiment of the present disclosure will be described with reference to FIGS. 21 through 25.

A lens module 100 according to the present exemplary embodiment may include an optical system composed of a first lens 10, a second lens 20, a third lens 30, a fourth lens 40, and a fifth lens 50, and may further include an IR cutoff filter 60 and an image sensor 70. In addition, the lens module 100 according to the present exemplary embodiment may have F No. of 1.88 and may have an FOV of 74.0 degrees.

In the present exemplary embodiment, the first lens 10 may have positive refractive power. A first surface of the first lens 10 may be convex and a second surface thereof may be concave. The second lens 20 may have positive refractive power. Both surfaces of the second lens 20 may be convex. The third lens 30 may have negative refractive power. A first surface of the third lens 30 may be convex and a second surface thereof may be concave. The fourth lens 40 may have positive refractive power. A first surface of the fourth lens 40 may be concave and a second surface thereof may be convex. The fifth lens 50 may have negative refractive power. A first surface of the fifth lens 50 may be convex and a second surface thereof may be concave. The fifth lens 50 may have an aspherical shape having a plurality of inflection points. For example, the first surface of the fifth lens 50 may have two or more inflection points. Also, the second surface of the fifth lens 50 may have two or more inflection points. The lens module 100 according to the present exemplary embodiment may include one or more stops ST. For example, the one or more stops ST may be disposed between the second lens 20 and the third lens 30.

The lens module configured in this manner may have aberration characteristics illustrated in FIGS. 22 and 23 and may have lens characteristics illustrated in FIGS. 24 and 25. For reference, FIG. 24 is a table showing radii of curvature, thicknesses and distances, refractive indices, Abbe numbers, and effective radii of lenses and FIG. 25 is a table showing aspherical values of lenses.

TABLE 1

| | FIRST EMBODI- MENT | SECOND EMBODI- MENT | THIRD EMBODI- MENT | FOURTH EMBODI- MENT | FIFTH EMBODI- MENT |
|---|---|---|---|---|---|
| TTL | 5.56 | 4.72 | 4.72 | 4.72 | 4.70 |
| ANG | 71.50 | 74.00 | 73.30 | 73.40 | 74.00 |
| Fno. | 2.28 | 1.97 | 1.99 | 1.99 | 1.88 |
| f | 4.79 | 3.94 | 3.98 | 3.98 | 3.92 |
| ImgH | 7.06 | 6.07 | 6.07 | 6.07 | 6.07 |

The aforementioned exemplary embodiments satisfy all the conditional expressions disclosed in the left horizontal axis as illustrated in Table 2 and Table 3.

TABLE 2

| CONDI- TIONAL EXPRESSION | FIRST EM- BODI- MENT | SECOND EM- BODI- MENT | THIRD EM- BODI- MENT | FOURTH EM- BODI- MENT | FIFTH EM- BODI- MENT |
|---|---|---|---|---|---|
| 39 < (ANG*ImgH)/ (Fno*TTL) < 52 | 39.82 | 48.31 | 47.37 | 47.44 | 50.80 |
| 0.33 < r1/f < 0.39 | 0.343 | 0.368 | 0.375 | 0.372 | 0.374 |
| 0.36 < r2/f < 0.41 | 0.364 | 0.384 | 0.399 | 0.397 | 0.402 |
| 0.43 < r3/f < 0.47 | 0.444 | 0.444 | 0.446 | 0.448 | 0.459 |
| 0.65 < TTL/ ImgH < 0.85 | 0.788 | 0.778 | 0.778 | 0.778 | 0.775 |
| 2.3 < Fno. | 2.280 | 1.970 | 1.990 | 1.990 | 1.880 |
| 31 < ANG/Fno. | 31.36 | 37.56 | 36.83 | 36.88 | 39.36 |
| V4 < 27 | 23.0 | 23.0 | 23.0 | 23.0 | 23.0 |
| 0.6 < 2*L51ER/ ImgH < 0.8 | 0.694 | 0.708 | 0.687 | 0.698 | 0.697 |
| 1.90 < L51ER < 2.65 | 2.451 | 2.150 | 2.085 | 2.118 | 2.114 |
| 2.18 < L52ER < 2.95 | 2.747 | 2.438 | 2.376 | 2.400 | 2.388 |
| 1.6 < n4 | 1.640 | 1.640 | 1.640 | 1.640 | 1.640 |
| 25 < V1-V3 | 33.0 | 33.0 | 33.0 | 33.0 | 33.0 |
| V1-V5 < 2 | 1.0 | 1.0 | 1.0 | 1.0 | 1.0 |
| 4.0 < f1/f | 4.563 | 5.112 | 4.568 | 4.421 | 4.138 |
| 0.5 < f2/f < 1.5 | 0.674 | 0.685 | 0.692 | 0.695 | 0.710 |
| |f3/f| < 2.0 | 1.166 | 1.208 | 1.311 | 1.351 | 1.366 |
| 0.5 < |f4/f| | 0.739 | 93.14 | 1792.7 | 55.94 | 17.98 |
| 0.3 < |f5/f| | 0.596 | 5.575 | 3.282 | 3.359 | 3.047 |

TABLE 3

| CONDI- TIONAL EXPRESSION | FIRST EM- BODI- MENT | SECOND EM- BODI- MENT | THIRD EM- BODI- MENT | FOURTH EM- BODI- MENT | FIFTH EM- BODI- MENT |
|---|---|---|---|---|---|
| TTL/f < 1.5 | 1.161 | 1.197 | 1.185 | 1.186 | 1.201 |
| 0.2 < |TTL/f1| | 0.254 | 0.234 | 0.259 | 0.268 | 0.290 |
| |TTL/f2| < 1.9 | 1.723 | 1.748 | 1.713 | 1.707 | 1.692 |
| |TTL/f3| < 1.0 | 0.995 | 0.991 | 0.904 | 0.878 | 0.879 |
| |TTL/f4| < 1.7 | 1.570 | 0.013 | 0.001 | 0.021 | 0.067 |
| |TTL/f5| < 2.1 | 1.947 | 0.215 | 0.361 | 0.353 | 0.394 |
| 5.0 < f1/f2 | 6.774 | 7.464 | 6.602 | 6.361 | 5.830 |
| 0.3 < |f2/f3| < 1.0 | 0.577 | 0.567 | 0.528 | 0.514 | 0.520 |
| |f3/f4| < 1.7 | 1.578 | 0.013 | 0.001 | 0.024 | 0.076 |
| 1.0 < |f4/f5| | 1.240 | 16.71 | 546.3 | 16.65 | 5.903 |
| 1.0 < |f1/f3| < 5.0 | 3.912 | 4.231 | 3.483 | 3.273 | 3.029 |
| |f1/f4| < 7.0 | 6.172 | 0.055 | 0.003 | 0.079 | 0.230 |
| 0.9 < |f1/f5| | 7.654 | 0.917 | 1.392 | 1.316 | 1.358 |
| 0.2 < BFL/f | 0.209 | 0.218 | 0.216 | 0.216 | 0.220 |
| 0.01 < D12/f | 0.065 | 0.074 | 0.074 | 0.074 | 0.083 |
| |r4/f| < 3.0 | 1.897 | 2.042 | 2.111 | 2.109 | 2.131 |
| 1.0 < |r5/f| | 4.247 | 3.473 | 1.835 | 2.104 | 2.076 |

TABLE 3-continued

| CONDITIONAL EXPRESSION | FIRST EMBODIMENT | SECOND EMBODIMENT | THIRD EMBODIMENT | FOURTH EMBODIMENT | FIFTH EMBODIMENT |
|---|---|---|---|---|---|
| 0.5 < |r6/f| | 0.627 | 0.626 | 0.565 | 0.604 | 0.606 |
| 1.0 < |r7/f| | 1.740 | 1.514 | 1.299 | 1.193 | 1.232 |
| 1.0 < |r8/f| | 1.570 | 1.533 | 1.354 | 1.298 | 1.170 |
| 0.3 < |r9/f| | 0.409 | 0.366 | 0.421 | 0.418 | 0.425 |
| 0.2 < |r10/f| | 0.292 | 0.287 | 0.304 | 0.304 | 0.304 |
| 5.0 < D12/D23 | 6.260 | 5.828 | ∞ | 7.410 | 8.092 |
| D23/D34 < 0.1 | 0.076 | 0.092 | 0.000 | 0.069 | 0.072 |
| D34/D45 < 3.0 | 1.723 | 2.102 | 2.291 | 2.965 | 2.774 |

Table 4 show effective radii of the fifth lens and positions of inflection points formed on the object-side surface and the image-side surface of the fifth lens.

TABLE 4

| | | FIRST EMBODIMENT | SECOND EMBODIMENT | THIRD EMBODIMENT | FOURTH EMBODIMENT | FIFTH EMBODIMENT |
|---|---|---|---|---|---|---|
| ImgH | | 7.06 | 6.06 | 6.06 | 6.06 | 6.08 |
| EFFECTIVE RADIUS (OF FIFTH LENS) | OBJECT-SIDE | 2.451 | 2.150 | 2.085 | 2.118 | 2.114 |
| | IMAGE-SIDE | 2.747 | 2.438 | 2.376 | 2.400 | 2.388 |
| FIRST INFLECTION POINT | OBJECT-SIDE | 0.200 | 0.200 | 0.180 | 0.170 | 0.180 |
| | IMAGE-SIDE | 0.300 | 0.250 | 0.250 | 0.250 | 0.260 |
| SECOND INFLECTION POINT | OBJECT-SIDE | 1.800 | 1.460 | 1.420 | 1.430 | 1.420 |
| | IMAGE-SIDE | NONE | NONE | NONE | NONE | NONE |
| THIRD INFLECTION POINT | OBJECT-SIDE | NONE | 2.12 | NONE | NONE | NONE |
| | IMAGE-SIDE | NONE | NONE | NONE | NONE | NONE |

Table 5 shows thicknesses of convex points and concave points formed in the fifth lens.

TABLE 5

| | FIRST EMBODIMENT | SECOND EMBODIMENT | THIRD EMBODIMENT | FOURTH EMBODIMENT | FIFTH EMBODIMENT |
|---|---|---|---|---|---|
| CT5 | 0.524 | 0.489 | 0.498 | 0.496 | 0.471 |
| Pt1 | 0.618 | 0.577 | 0.565 | 0.567 | 0.545 |
| Pt2 | 0.770 | 0.739 | 0.740 | 0.741 | 0.710 |
| Pt1/CT5 | 1.180 | 1.180 | 1.135 | 1.144 | 1.157 |
| Pt2/CT5 | 1.471 | 1.512 | 1.486 | 1.495 | 1.507 |
| Pt1/Pt2 | 0.803 | 0.781 | 0.764 | 0.765 | 0.768 |

As set forth above, according to exemplary embodiments of the present disclosure, an optical system having high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
    a first lens having positive refractive power and having a convex object-side surface and a concave image-side surface;
    a second lens having two convex surfaces;
    a third lens having a convex object-side surface;
    a fourth lens; and
    a fifth lens having a convex object-side surface, wherein the first lens, the second lens, the third lens, the fourth lens and the fifth lens are disposed in a sequential order from the first lens to the fifth lens, wherein the lens module satisfies the following conditional expression:

$0.6 < 2*L51ER/\text{ImgH} < 0.8$  [Conditional expression]

where L51ER is a radius of an effective area refracting incident light from an object-side surface of the fifth lens, and ImgH is a diagonal length of an imaging surface.

2. The lens module of claim 1, wherein the fifth lens has one or more inflection points formed on an image-side surface thereof.

3. The lens module of claim 1, wherein the lens module satisfies the following conditional expression:

$39 < (ANG*\text{ImgH})/(Fno*TTL) < 52$  [Conditional expression]

wherein ANG is a field of view (or an angle of view) of the optical system composed of the first to fifth lenses, ImgH is a diagonal length of an imaging surface, Fno is a constant (F No.) representing brightness of the optical system, and TTL is a distance from an object-side surface of the first lens to the imaging surface.

4. The lens module of claim 1, wherein the lens module satisfies the following conditional expression:

$0.33 < r1/f < 0.39$  [Conditional expression]

where r1 is a radius of curvature of the object-side surface of the first lens and f is an overall focal length of the optical system composed of the first to fifth lenses.

5. The lens module of claim 1, wherein the lens module satisfies the following conditional expression:

$0.36 < r2/f < 0.41$  [Conditional expression]

where r2 is a radius curvature of the image-side surface of the first lens and f is an overall focal length of the optical system composed of the first to fifth lenses.

6. The lens module of claim 1, wherein the lens module satisfies the following conditional expression:

$0.43 < r3/f < 0.47$  [Conditional expression]

where r3 is a radius curvature of the object-side surface of the second lens and f is an overall focal length of the optical system composed of the first to fifth lenses.

7. The lens module of claim 1, wherein the lens module satisfies the following conditional expression:

$0.65 < TTL/ImgH < 0.85$ [Conditional expression]

where TTL is a distance from an object-side surface of the first lens to an imaging surface, and ImgH is a diagonal length of the imaging surface.

8. The lens module of claim 1, wherein the lens module satisfies the following conditional expression:

$Fno < 2.3$ [Conditional expression]

where Fno is a constant representing brightness of the optical system composed of the first to fifth lenses.

9. The lens module of claim 1, wherein the lens module satisfies the following conditional expression:

$31 < ANG/Fno$ [Conditional expression]

where ANG is a field of view of the optical system composed of the first to fifth lenses and Fno is a constant representing brightness of the optical system.

10. The lens module of claim 1, wherein the lens module satisfies the following conditional expression:

$V4 < 27$ [Conditional expression]

where V4 is the Abbe number of the fourth lens.

11. The lens module of claim 1, wherein the second lens, the third lens, the fourth lens, and the fifth lens each comprise refractive power.

12. The lens module of claim 1, wherein the lens module satisfies the following conditional expression:

$25 < V1 - V3$ [Conditional expression]

where V1 is the Abbe number of the first lens and V3 is the Abbe number of the third lens.

13. The lens module of claim 1, wherein the lens module satisfies the following conditional expression:

$4.0 < f1/f$ [Conditional expression]

where f1 is a focal length of the first lens and f is an overall focal length of the optical system composed of the first to fifth lenses.

14. The lens module of claim 1, wherein the lens module satisfies the following conditional expression:

$0.5 < f2/f < 1.5$ [Conditional expression]

where, f2 is a focal length of the second lens and f is an overall focal length of the optical system composed of the first to fifth lenses.

15. The lens module of claim 1, wherein the lens module satisfies the following conditional expression:

$|f3/f| < 2.0$ [Conditional expression]

where f3 is a focal length of the third lens and f is an overall focal length of the optical system composed of the first to fifth lenses.

16. The lens module of claim 1, wherein the lens module satisfies the following conditional expression:

$TTL/f < 1.5$ [Conditional expression]

where TTL is a distance from an object-side surface of the first lens to an imaging surface and f is an overall focal length of the optical system composed of the first to fifth lenses.

17. The lens module of claim 1, wherein the lens module satisfies the following conditional expression:

$|TTL/f2| < 1.9$ [Conditional expression]

where TTL is a distance from an object-side surface of the first lens to an imaging surface and f2 is a focal length of the second lens.

18. The lens module of claim 1, wherein the lens module satisfies the following conditional expression:

$|TTL/f3| < 1.0$ [Conditional expression]

where TTL is a distance from an object-side surface of the first lens to an imaging surface and f3 is a focal length of the third lens.

19. The lens module of claim 1, wherein the lens module satisfies the following conditional expression:

$|TTL/f4| < 1.7$ [Conditional expression]

where TTL is a distance from an object-side surface of the first lens to an imaging surface and f4 is a focal length of the fourth lens.

20. The lens module of claim 1, wherein the lens module satisfies the following conditional expression:

$5.0 < f1/f2$ [Conditional expression]

where f1 is a focal length of the first lens and f2 is a focal length of the second lens.

21. The lens module of claim 1, wherein the lens module satisfies the following conditional expression:

$0.3 < |f2/f3| < 1.0$ [Conditional expression]

where f2 is a focal length of the second lens and f3 is a focal length of the third lens.

22. The lens module of claim 1, wherein the lens module satisfies the following conditional expression:

$|f3/f4| < 1.7$ [Conditional expression]

where f3 is a focal length of the third lens and f4 is a focal length of the fourth lens.

23. The lens module of claim 1, wherein the lens module satisfies the following conditional expression:

$1.0 < |f4/f5|$ [Conditional expression]

where f4 is a focal length of the fourth lens and f5 is a focal length of the fifth lens.

24. The lens module of claim 1, wherein the lens module satisfies the following conditional expression:

$1.0 < |f1/f3| < 5.0$ [Conditional expression]

where f1 is a focal length of the first lens and f3 is a focal length of the third lens.

25. The lens module of claim 1, wherein the lens module satisfies the following conditional expression:

$|f1/f4| < 7.0$ [Conditional expression]

where f1 is a focal length of the first lens and f4 is a focal length of the fourth lens.

26. The lens module of claim 1, wherein the lens module satisfies the following conditional expression:

$0.9 < |f1/f5|$ [Conditional expression]

where f1 is a focal length of the first lens and f5 is a focal length of the fifth lens.

27. The lens module of claim 1, wherein the lens module satisfies the following conditional expression:

$0.2 < BFL/f$ [Conditional expression]

where BFL is a distance from an image-side surface of the fifth lens to an imaging surface and f is an overall focal length of the optical system composed of the first to fifth lenses.

28. The lens module of claim 1, wherein the lens module satisfies the following conditional expression:

$0.01 < D12/f$ [Conditional expression]

where D12 is a distance from an image-side surface of the first lens to an object-side surface of the second lens and f is an overall focal length of the optical system composed of the first to fifth lenses.

29. The lens module of claim 1, wherein the lens module satisfies the following conditional expression:

$|r4/f|<3.0$ [Conditional expression]

where r4 is a radius of curvature of an image-side surface of the second lens and f is an overall focal length of the optical system composed of the first to fifth lenses.

30. The lens module of claim 1, wherein the lens module satisfies the following conditional expression:

$1.0<|r5/f|$ [Conditional expression]

where r5 is a radius of curvature of an object-side surface of the third lens and f is an overall focal length of the optical system composed of the first to fifth lenses.

31. The lens module of claim 1, wherein the lens module satisfies the following conditional expression:

$0.5<|r6/f|$ [Conditional expression]

where r6 is a radius of curvature of an image-side surface of the third lens and f is an overall focal length of the optical system composed of the first to fifth lenses.

32. The lens module of claim 1, wherein the lens module satisfies the following conditional expression:

$1.0<|r7/f|$ [Conditional expression]

where r7 is a radius of curvature of an object-side surface of the fourth lens and f is an overall focal length of the optical system composed of the first to fifth lenses.

33. The lens module of claim 1, wherein the lens module satisfies the following conditional expression:

$1.0<|r8/f|$ [Conditional expression]

where r8 is a radius of curvature of an image-side surface of the fourth lens and f is an overall focal length of the optical system composed of the first to fifth lenses.

34. The lens module of claim 1, wherein the lens module satisfies the following conditional expression:

$0.3<|r9/f|$ [Conditional expression]

where r9 is a radius of curvature of an object-side surface of the fifth lens and f is an overall focal length of the optical system composed of the first to fifth lenses.

35. The lens module of claim 1, wherein the lens module satisfies the following conditional expression:

$0.2<|r10/f|$ [Conditional expression]

where r10 is a radius of curvature of an image-side surface of the fifth lens and f is an overall focal length of the optical system composed of the first to fifth lenses.

36. The lens module of claim 1, wherein the lens module satisfies the following conditional expression:

$5.0<D12/D23$ [Conditional expression]

where D12 is a distance from an image-side surface of the first lens to an object-side surface of the second lens and D23 is a distance from an image-side surface of the second lens to an object-side surface of the third lens.

37. The lens module of claim 1, wherein the lens module satisfies the following conditional expression:

$D23/D34<0.1$ [Conditional expression]

where D23 is a distance from an image-side surface of the second lens to an object-side surface of the third lens and D34 is a distance from an image-side surface of the third lens to an object-side surface of the fourth lens.

38. The lens module of claim 1, wherein the lens module satisfies the following conditional expression:

$D34/D45<3.0$ [Conditional expression]

where D34 is a distance from an image-side surface of the third lens to an object-side surface of the fourth lens and D45 is a distance from an image-side surface of the fourth lens to an object-side surface of the fifth lens.

39. The lens module of claim 1, further comprising a stop disposed in front of the object-side of the first lens or an object-side of the third lens.

40. A lens module comprising:
a first lens having positive refractive power and having a convex object-side surface and a concave image-side surface;
a second lens having refractive power and having two convex surfaces;
a third lens having refractive power;
a fourth lens having refractive power; and
a fifth lens having refractive power and having one or more inflection points formed on an image-side surface thereof, wherein the fifth lens satisfies the following conditional expression:

$0.09<IP521/L52ER<0.12$ [Conditional expression]

where IP521 is a radius from the optical axis to an inflection point, among inflection points formed on an image-side surface of the fifth lens, formed in a position closest to the optical axis and L52ER is a radius of an effective area refracting incident light from the image-side surface of the fifth lens.

41. The lens module of claim 40, wherein the lens module satisfies the following conditional expression:

$0.36<2*IP512/ImgH<0.61$ [Conditional expression]

where IP512 is a radius from optical axis to an inflection point, among inflection points formed on an object-side surface of the fifth lens, formed in a position second-closest to the optical axis and ImgH is a diagonal length of an imaging surface.

42. The lens module of claim 40, wherein the lens module satisfies the following conditional expression:

$0.07<2*IP521/ImgH<0.10$ [Conditional expression]

where IP521 is a radius from the optical axis to an inflection point, among inflection points formed on an image-side surface of the fifth lens, formed in a position closest to the optical axis and ImgH is a diagonal length of an imaging surface.

43. The lens module of claim 40, wherein the lens module satisfies the following conditional expression:

$0.08<IP511/L51ER<0.11$ [Conditional expression]

where IP511 is a radius from the optical axis to an inflection point, among inflection points formed on the object-side surface of the fifth lens, formed in a position closest to the optical axis and L51ER is a radius of an effective area refracting incident light from an object-side surface of the fifth lens.

44. The lens module of claim 40, wherein the lens module satisfies the following conditional expression:

$0.58<IP512/L51ER<0.84$ [Conditional expression]

where IP512 is a radius from optical axis to an inflection point, among inflection points formed on the object-side surface of the fifth lens, formed in a position second-closest to the optical axis and L51ER is a radius of an effective area refracting incident light from an object-side surface of the fifth lens.

45. The lens module of claim 40, wherein the lens module satisfies the following conditional expression:

$0.05 < 2*IP511/ImgH < 0.08$ [Conditional expression]

where IP511 is a radius from the optical axis to an inflection point, among inflection points formed on the object-side surface of the fifth lens, formed in a position closest to the optical axis and ImgH is a diagonal length of an imaging surface.

46. The lens module of claim 40, wherein the third lens has a convex object-side surface.

47. A lens module comprising:
a first lens having refractive power;
a second lens having refractive power;
a third lens having refractive power;
a fourth lens having refractive power; and
a fifth lens having refractive power, having a convex object-side surface, and having an aspherical shape with four or more inflection points formed on the object-side surface thereof, wherein the lens module satisfies the following conditional expression:

$1.90 < L51ER < 2.65$ [Conditional expression]

where L51ER is a radius of an effective area refracting incident light from an object-side surface of the fifth lens.

48. The lens module of claim 47, wherein the lens module satisfies the following conditional expression:

$2.18 < L52ER < 2.95$ [Conditional expression]

where L52ER is a radius of an effective area refracting incident light from an image-side surface of the fifth lens.

49. A lens module comprising:
first to fifth lenses disposed, starting from an object-side, in order and respectively having refractive power,
wherein the fifth lens has an aspherical shape with a first concave point formed in a portion not intersecting an optical axis of an object-side surface thereof and a first convex point formed in a portion not intersecting an optical axis of an image-side surface thereof, and satisfies the following conditional expression:

$0.93 < Pt1/CT5 < 1.38$ [Conditional expression]

where CT5 is a thickness at the center of the optical axis of the fifth lens and Pt1 is a thickness at the first concave point.

50. The lens module of claim 49, wherein the lens module satisfies the following conditional expression:

$1.27 < Pt2/CT5 < 1.71$ [Conditional expression]

where CT5 is a thickness at the center of the optical axis of the fifth lens and Pt2 is a thickness at the first convex point.

51. The lens module of claim 49, wherein the lens module satisfies the following conditional expression:

$0.56 < Pt1/Pt2 < 1.01$ [Conditional expression]

where Pt1 is a thickness at the first concave point and Pt2 is a thickness at the first convex point.

52. The lens module of claim 49, wherein the lens module satisfies the following conditional expression:

$0.44 < Pt1 < 0.72$ [Conditional expression]

where Pt1 is a thickness at the first concave point.

53. The lens module of claim 49, wherein the lens module satisfies the following conditional expression:

$0.61 < Pt2 < 0.87$ [Conditional expression]

where Pt2 is a thickness at the first convex point.

* * * * *